(12) United States Patent
Islam et al.

(10) Patent No.: US 10,244,492 B2
(45) Date of Patent: Mar. 26, 2019

(54) INTERLEAVED BEAM SWEEPING FOR SYNCHRONIZATION AND RANDOM ACCESS PROCEDURES

(71) Applicant: QUALCOMM Incorporated, San Diego, CA (US)

(72) Inventors: Muhammad Nazmul Islam, Edison, NJ (US); Junyi Li, Chester, NJ (US); Sundar Subramanian, Bridgewater, NJ (US); Juergen Cezanne, Ocean Township, NJ (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 15/336,330

(22) Filed: Oct. 27, 2016

(65) Prior Publication Data
US 2017/0289932 A1    Oct. 5, 2017

Related U.S. Application Data

(60) Provisional application No. 62/318,201, filed on Apr. 4, 2016, provisional application No. 62/319,232, filed on Apr. 6, 2016.

(51) Int. Cl.
*H04W 56/00* (2009.01)
*H04W 74/08* (2009.01)
(Continued)

(52) U.S. Cl.
CPC ........ *H04W 56/001* (2013.01); *H04B 7/0617* (2013.01); *H04B 7/0686* (2013.01); *H04B 7/0868* (2013.01); *H04W 74/0833* (2013.01)

(58) Field of Classification Search
CPC .. H04B 7/0617; H04B 7/0686; H04B 7/0868; H04W 56/001; H04W 74/0833
See application file for complete search history.

(56) References Cited

U.S. PATENT DOCUMENTS

| | | |
|---|---|---|
| 2005/0169388 A1 | 8/2005 | Toland et al. |
| 2010/0182903 A1* | 7/2010 | Palanki ............. H04L 1/0041 370/225 |

(Continued)

OTHER PUBLICATIONS

ISA/EP, International Search Report and Written Opinion of the International Searching Authority, Int'l Application No. PCT/US2017/020983, dated May 23, 2017, European Patent Office, Rijswijk, NL, 15 pgs.

*Primary Examiner* — Benjamin H Elliott, IV
(74) *Attorney, Agent, or Firm* — Clint R. Morin; Holland & Hart

(57) ABSTRACT

Methods, systems, and devices for wireless communication are described. The method may include transmitting a first synchronization signal in a set of beam directions during a first symbol period of a synchronization subframe and transmitting a second synchronization signal in another set of beam directions during a second symbol period of the synchronization subframe. The second set of beam directions may be spatially interleaved with the first set of beam directions. Additionally, the method may include monitoring a first and second set of beam directions during a first and second symbol period of a random access subframe, respectively. Additionally, the method may include receiving, from a base station, first and second synchronization signals in a synchronization subframe, decoding the first synchronization signal, and transmitting an access request based at least in part on the decoded first synchronization signal.

30 Claims, 20 Drawing Sheets

(51) Int. Cl.
   *H04B 7/06*     (2006.01)
   *H04B 7/08*     (2006.01)

(56) References Cited

U.S. PATENT DOCUMENTS

| | | |
|---|---|---|
| 2013/0028186 A1 | 1/2013 | Kim |
| 2014/0010178 A1 | 1/2014 | Yu et al. |
| 2014/0177607 A1 | 6/2014 | Li et al. |
| 2015/0373593 A1 | 12/2015 | Ryu et al. |
| 2015/0382334 A1 | 12/2015 | El Ayach et al. |
| 2016/0043781 A1* | 2/2016 | Cho ................ H04L 5/0051 342/373 |
| 2016/0344519 A1* | 11/2016 | Lin .................. H04L 5/005 |
| 2017/0215127 A1* | 7/2017 | McGowan ........ H04W 48/10 |
| 2017/0289910 A1* | 10/2017 | Islam .............. H04W 52/0225 |
| 2017/0289932 A1* | 10/2017 | Islam .............. H04W 56/001 |
| 2017/0290003 A1* | 10/2017 | Islam .............. H04W 72/1284 |
| 2018/0041949 A1* | 2/2018 | Liu ................ H04W 48/16 |

\* cited by examiner

Beamforming for First Symbol Period

Beamforming for Second Symbol Period

Beamforming for First Symbol Period

Beamforming for Second Symbol Period

Beamforming for Third Symbol Period

INTERLEAVED BEAM SWEEPING FOR SYNCHRONIZATION AND RANDOM ACCESS PROCEDURES

CROSS REFERENCES

The present application for patent claims priority to U.S. Provisional Patent Application No. 62/318,201 by Islam, et al., entitled "Interleaved Beam Sweeping For Synchronization and Random Access Procedures" filed Apr. 4, 2016, and U.S. Provisional Patent Application No. 62/319,232 by Islam, et al., entitled, "Interleaved Beam Sweeping for Synchronization and Random Access Procedures" filed Apr. 6, 2016, assigned to the assignee hereof.

BACKGROUND

The following relates generally to wireless communication, and more specifically to interleaved beam sweeping for synchronization and random access.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In some cases, a wireless network may operate in millimeter wave (mmW) spectrum. Using mmW spectrum may result in additional attenuation which may impact the link budget of the communications. In some cases, wireless devices operating in mmW spectrum may utilize beamforming to increase the strength of wireless signals in particular directions. However, using beamforming techniques may create undesired latency for a UE in receiving broadcast signals from the base station. For example, UEs outside of the initial range of a beamforming sweep may not receive system information to be used for system access, or receive such system information more slowly than UEs inside the initial range of the beamforming sweep, or when beamforming techniques are not used.

SUMMARY

Methods, systems, and devices for wireless communication are described. The method may include transmitting, for example by a base station, a first set of synchronization signals in a set of beam directions during a first symbol period of a synchronization subframe and transmitting a second set of synchronization signals in another set of beam directions during a second symbol period of the synchronization subframe. The second set of beam directions may be spatially interleaved with the first set of beam directions. Each of the first set of beam directions may be non-contiguous with each other of the first set of beam directions, and each of the second set of beam directions may be non-contiguous with each other of the second set of beam directions. The first and second sets of beam directions may alternate radially from a transmitting base station. A third set of beam directions may also be spatially interleaved with the first and second sets of beam directions, and the third set of beam directions transmitted during a third symbol period of the synchronization subframe.

Additionally, the method may include monitoring, for example by the base station, a first and second set of beam directions during a first and second symbol period of a random access subframe, respectively. The base station may receive a random access signal from a UE during the first symbol period when monitoring the first and second set of beam directions. The first set of beam directions used for monitoring may be spatially interleaved with the second set of beam directions used for monitoring. The beam directions may be non-contiguous with each other beam direction of the given set.

The method may also include receiving, from a base station, first and second synchronization signals in a synchronization subframe, decoding the first synchronization signal, and transmitting an access request based at least in part on the decoded first synchronization signal.

A method of wireless communication is described. The method may include transmitting a first plurality of synchronization signals in a first set of beam directions during a first symbol period of a synchronization subframe and transmitting a second plurality of synchronization signals in a second set of beam directions during a second symbol period of the synchronization subframe, the second set of beam directions spatially interleaved with the first set of beam directions, and the first symbol period preceding the second symbol period in the synchronization subframe.

An apparatus for wireless communication is described. The apparatus may include means for transmitting a first plurality of synchronization signals in a first set of beam directions during a first symbol period of a synchronization subframe and means for transmitting a second plurality of synchronization signals in a second set of beam directions during a second symbol period of the synchronization subframe, the second set of beam directions spatially interleaved with the first set of beam directions, and the first symbol period preceding the second symbol period in the synchronization subframe.

A further apparatus is described. The apparatus may include a processor, memory in electronic communication with the processor, and instructions stored in the memory. The instructions may be operable to cause the processor to transmit a first plurality of synchronization signals in a first set of beam directions during a first symbol period of a synchronization subframe and transmit a second plurality of synchronization signals in a second set of beam directions during a second symbol period of the synchronization subframe, the second set of beam directions spatially interleaved with the first set of beam directions, and the first symbol period preceding the second symbol period in the synchronization subframe.

A non-transitory computer readable medium for wireless communication is described. The non-transitory computer-readable medium may include instructions to cause a processor to transmit a first set of synchronization signals in a first set of beam directions during a first symbol period of a synchronization subframe and transmit a second set of synchronization signals in a second set of beam directions during a second symbol period of the synchronization subframe, the second set of beam directions spatially interleaved with the first set of beam directions, and the first symbol period preceding the second symbol period in the synchronization subframe.

Some examples of the method, apparatus, or non-transitory computer-readable medium described above may further include processes, features, means, or instructions for receiving a random access signal from a user equipment (UE) based on a synchronization signal of the first set of synchronization signals received by the UE.

Some examples of the method, apparatus, or non-transitory computer-readable medium described above may further include processes, features, means, or instructions for monitoring the first set of beam directions during a first symbol period of a random access subframe. Some examples of the method, apparatus, or non-transitory computer-readable medium described above may further include processes, features, means, or instructions for monitoring the second set of beam directions during a second symbol period of the random access subframe.

In some examples of the method, apparatus, or non-transitory computer-readable medium described above, the second set of beam directions alternate radially with the first set of beam directions. In some examples of the method, apparatus, or non-transitory computer-readable medium described above, each beam direction of the first set of beam directions are non-contiguous with each other beam direction of the first set of beam directions.

Some examples of the method, apparatus, or non-transitory computer-readable medium described above may further include processes, features, means, or instructions for transmitting, during a third symbol period of the synchronization subframe, the first set of synchronization signals in the first set of beam directions.

In some examples of the method, apparatus, or non-transitory computer-readable medium described above, the third symbol period is contiguous with the first symbol period. Some examples of the method, apparatus, or non-transitory computer-readable medium described above may further include processes, features, means, or instructions for transmitting a third set of synchronization signals in a third set of beam directions during a third symbol period of the synchronization subframe, the third set of beam directions spatially interleaved with the first set of beam directions and the second set of beam directions.

In some examples of the method, apparatus, or non-transitory computer-readable medium described above, transmitting the first set of synchronization signals comprises transmitting the first set of synchronization signals using a set of ports of an antenna array of the base station. Some examples of the method, apparatus, or non-transitory computer-readable medium described above may further include processes, features, means, or instructions for transmitting the second set of synchronization signals comprises transmitting the second set of synchronization signals using the set of ports of the antenna array.

A method of wireless communication is described. The method may include monitoring a first set of beam directions during a first symbol period of a random access subframe and monitoring a second set of beam directions during a second symbol period of the random access subframe, the second set of beam directions spatially interleaved with the first set of beam directions.

An apparatus for wireless communication is described. The apparatus may include means for monitoring a first set of beam directions during a first symbol period of a random access subframe and means for monitoring a second set of beam directions during a second symbol period of the random access subframe, the second set of beam directions spatially interleaved with the first set of beam directions.

A further apparatus is described. The apparatus may include a processor, memory in electronic communication with the processor, and instructions stored in the memory. The instructions may be operable to cause the processor to monitor a first set of beam directions during a first symbol period of a random access subframe and monitor a second set of beam directions during a second symbol period of the random access subframe, the second set of beam directions spatially interleaved with the first set of beam directions.

A non-transitory computer readable medium for wireless communication is described. The non-transitory computer-readable medium may include instructions to cause a processor to monitor a first set of beam directions during a first symbol period of a random access subframe and monitor a second set of beam directions during a second symbol period of the random access subframe, the second set of beam directions spatially interleaved with the first set of beam directions.

Some examples of the method, apparatus, or non-transitory computer-readable medium described above may further include processes, features, means, or instructions for receiving a first random access signal during the first symbol period from a first user equipment (UE).

In some examples of the method, apparatus, or non-transitory computer-readable medium described above, the second set of beam directions alternate radially with the first set of beam directions. In some examples of the method, apparatus, or non-transitory computer-readable medium described above, each beam direction of the first set of beam directions are non-contiguous with each other beam direction of the first set of beam directions.

Some examples of the method, apparatus, or non-transitory computer-readable medium described above may further include processes, features, means, or instructions for monitoring a third set of beam directions during a third symbol period of the random access subframe, the third set of beam directions spatially interleaved with the first set of beam directions and the second set of beam directions.

In some examples of the method, apparatus, or non-transitory computer-readable medium described above, monitoring the first set of beam directions comprises monitoring the first set of beam directions using a set of ports of an antenna array of the base station during the first symbol period. Some examples of the method, apparatus, or non-transitory computer-readable medium described above may further include processes, features, means, or instructions for monitoring the second set of beam directions comprises monitoring the second set of beam directions using the set of ports during the second symbol period.

A method of wireless communication is described. The method may include receiving, from a base station, a first synchronization signal in a synchronization subframe, decoding the first synchronization signal, receiving, from the base station, a second synchronization signal in the synchronization subframe, the second synchronization signal having a higher power than the first synchronization signal and transmitting, to the base station, an access request based at least in part on the decoded first synchronization signal.

An apparatus for wireless communication is described. The apparatus may include means for receiving, from a base station, a first synchronization signal in a synchronization subframe, means for decoding the first synchronization signal, means for receiving, from the base station, a second synchronization signal in the synchronization subframe, the second synchronization signal having a higher power than the first synchronization signal and means for transmitting, to the base station, an access request based at least in part on the decoded first synchronization signal.

A further apparatus is described. The apparatus may include a processor, memory in electronic communication with the processor, and instructions stored in the memory. The instructions may be operable to cause the processor to receive, from a base station, a first synchronization signal in a synchronization subframe, decode the first synchronization signal, receive, from the base station, a second synchronization signal in the synchronization subframe, the second synchronization signal having a higher power than the first synchronization signal and transmit, to the base station, an access request based at least in part on the decoded first synchronization signal.

A non-transitory computer readable medium for wireless communication is described. The non-transitory computer-readable medium may include instructions to cause a processor to receive, from a base station, a first synchronization signal in a synchronization subframe, decode the first synchronization signal, receive, from the base station, a second synchronization signal in the synchronization subframe, the second synchronization signal having a higher power than the first synchronization signal and transmit, to the base station, an access request based on the decoded first synchronization signal.

Some examples of the method, apparatus, or non-transitory computer-readable medium described above may further include processes, features, means, or instructions for determining a beamforming matrix for the access request based on the first synchronization signal or the second synchronization signal.

In some examples of the method, apparatus, or non-transitory computer-readable medium described above, transmitting the access request comprises transmitting a random access subframe that includes the access request.

DETAILED DESCRIPTION

Figure 1:
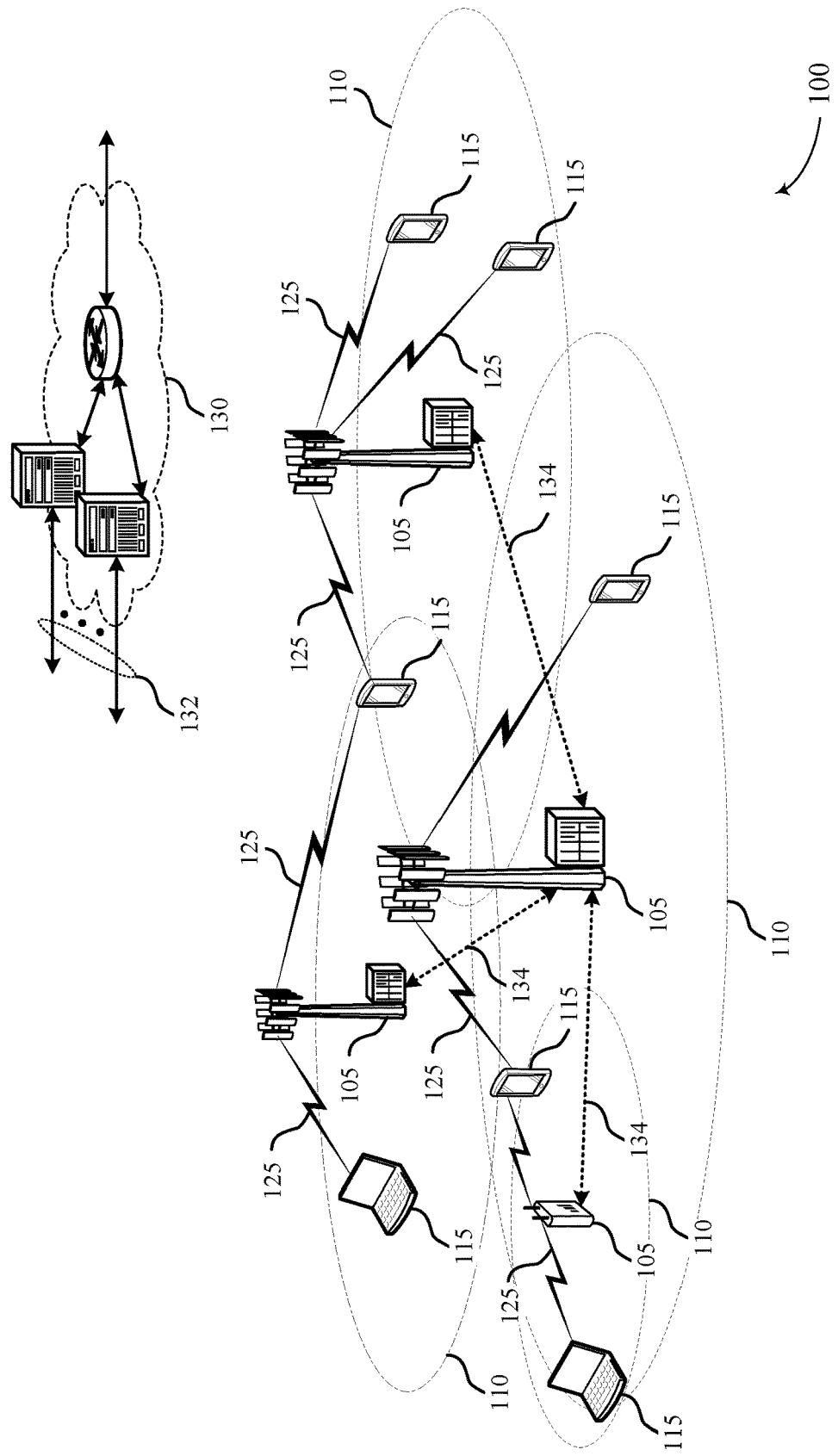
FIG. 1 illustrates an example of a wireless communications system that supports interleaved beam sweeping for synchronization and random access procedures in accordance with aspects of the present disclosure.

Some wireless communications systems may operate in millimeter wave (mmW) frequency ranges. Signal transmissions in these systems may experience increased attenuation due to a variety of factors, including path loss, temperature, barometric pressure, diffraction, obstacle interference, etc. Signal processing techniques, such as beamforming, may be used to overcome this signal attenuation.

In mmW systems, signals (e.g., synchronization signals) may be beamformed to meet a certain link budget (e.g., an accounting of gains and losses associated with a transmitter and/or a receiver when communicating over a medium). In particular, beamforming may be used to increase the strength or power of wireless signals in a certain direction. In particular, base stations may use several antenna ports connected to subarrays of antennas to form the beams in various directions by appropriately weighting the magnitude and phase of individual antenna ports and signals. A base station may thus use beamforming to transmit signals, including synchronization signals, in multiple directions.

However, beamforming techniques may create undesired latency, as base stations may be limited in the number of directions that the base station may transmit in (e.g., by the number of ports the base station has). For example, with beamform sweeping, base stations may transmit a synchronization signal in specified directions within a given timeframe. If a UE is not within the specified direction, the UE will not receive the synchronization signal, and the UE may not communicate with the base station. This may cause latency, as the UE may not receive the synchronization signal from the base station until the base station's sweeping process transmits the synchronization signal in the direction of the UE.

A base station may alternate beamforming direction patterns to expand the number of directions that the base station transmits to at during a given time. For example, a base station may interleave beamforming patterns, where a beam in a first pattern may radially alternate with beams of a second pattern. The first pattern may transmit a synchronization signal. However, there may not be a high received power at a UE because of a low gain associated with a beam. A UE may still decode the received synchronization signal for random access message purposes even though the UE may have to wait to receive a second synchronization signal in order to determine beamforming parameters to use in communication with the base station. This early synchronization signal decoding may reduce latency by reducing the time a UE may wait to receive the synchronization signal.

The synchronization signals transmitted by a base station may be used by a user equipment (UE) to transmit a random access message to the base station. UEs may use random access procedures to establish a connection with a base station. For example, a UE may determine that it has data to send and may use random access procedures to initiate a data transfer with a base station. A random access message transmission may be based on a synchronization signal received from a base station. For example, the transmission of synchronization signals from a base station may be used by a UE to identify timing and/or frequency resources to send the random access message.

In mmW systems, synchronization signals may be beamformed to meet a certain link budget (e.g., an accounting of gains and losses associated with a transmitter and/or a receiver when communicating over a medium). In particular, beamforming may be used to increase the strength or power of wireless signals in a particular direction. In such cases, base stations may use several antenna ports connected to subarrays of antennas to form the beams in various directions by appropriately weighting the magnitude and phase of individual antenna ports and signals. A base station may thus use beamforming to transmit the synchronization signals in multiple particular directions.

A base station may transmit a synchronization subframe that includes physical broadcast channel (PBCH) signals interspersed within beamforming reference signals. In some cases, the beamforming reference signals from different antenna ports may be code division multiplexed or frequency division multiplexed over multiple frequency tones. A UE may use the beamforming reference signals to generate channel estimates for the PBCH signals. In some cases, orthogonal cover codes for code division multiplexed signals may be selected to facilitate generation of channel estimates for PBCH signals transmitted using nearby frequency tones.

During a synchronization period (e.g., a duration of synchronization signal transmissions), a base station may transmit on its antenna ports over several symbols. The beam sweeping during the synchronization period may also be used to deliver a broadcast signal, such as a PBCH signal. In some cases, the synchronization period may include transmissions of multiple beam reference signals that correspond to each antenna port. The beam reference signals may allow a UE to measure a received signal strength indicator (RSSI) and the frequency selectivity of each beam, and may thus allow the UE to identify a radio channel along which the beam travels from the base station.

In some examples, a base station may assign beam reference signals to different (or disjoint) sets of subcarriers to enable a UE to distinguish between the beam reference signals associated with different antenna ports. Additionally or alternatively, each antenna port may transmit the broadcast signal using a set of subcarriers different from those associated with beam reference signals, where each antenna port may transmit the broadcast signal in the same set of subcarriers.

Aspects of the disclosure are initially described in the context of a wireless communication system. Aspects of the disclosure are further illustrated by and described with reference to apparatus diagrams, system diagrams, and flowcharts that relate to interleaved beam sweeping for synchronization and random access procedures.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Base station 105 may transmit a first synchronization signal to a UE 115 in a set of beam directions during a first symbol period of a synchronization subframe and transmit a second synchronization signal in another set of beam directions during a second symbol period of the synchronization subframe. The second set of beam directions may be spatially interleaved with the first set of beam directions, as further described herein. Additionally or alternatively, base station 105 may monitor a first and second set of beam directions during a first and second symbol period of a random access subframe, respectively. The second set of monitored beam directions may be spatially interleaved with the first set of monitored beam directions, as further described herein. Additionally, UE 115 may receive, from base station 105, first and second synchronization signals in a synchronization subframe, decode the first synchronization signal, and transmit an access request based at least in part on the decoded first synchronization signal.

Figure 2:
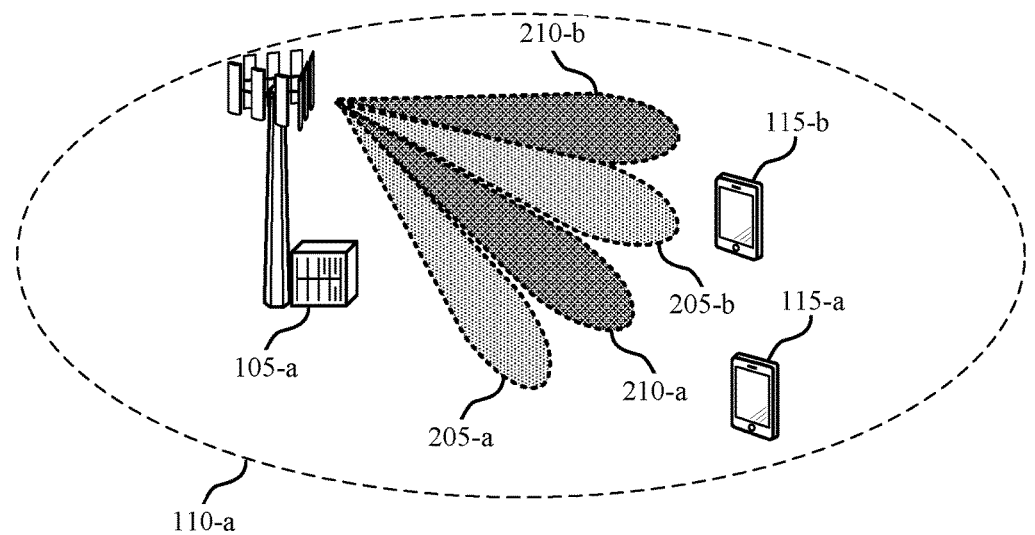
FIG. 2 illustrates an example of a wireless communications system for interleaved beam sweeping for synchronization and random access procedures in accordance with aspects of the present disclosure.
Figure 2:
Figure 2:

FIG. 2 illustrates an example of a wireless communications system 200 for interleaved beam sweeping for synchronization and random access procedures. Wireless communications system 200 may include base station 105-a, UE 115-a, and UE 115-b, which may be examples of the corresponding devices described with reference to FIG. 1. Spatially interleaved sets of beams, including a first set of beams in a first symbol period interleaved with a second set of beams in a second symbol period, may be used to transmit in a synchronization subframe and/or monitor for access requests in a random access subframe.

Interleaved sweeping procedures may reduce latency in synchronization signal communications to a UE. Base station 105-a may configure a first set of beam directions for synchronization signals to be broadcast to a UEs 115-a and 115-b. Base station 105-a may transmit the synchronization signals by beamforming using interleaved sweeping. The base station may schedule to transmit a first set of synchronization signals over a first symbol period of a synchronization subframe and a second set of synchronization signals over a second symbol period of the synchronization subframe. For the first set of synchronization signals, base station 105-a may transmit the synchronization signals in a first set of beams directions (e.g., beams 205-*a* and 205-*b*), where the first set of beams 205-*a* and 205-*b* may correspond to a part of a first set of beam directions. For the second symbol period, base station 105-*a* may transmit the second set of synchronization signals in a second set of beams (e.g., beams 210-*a* and 210-*b*), where the second set of beams 210-*a* and 210-*b* may correspond to a part of a second set of beam directions. The second set of beam directions may interleave with the first set of beam directions. For example, beam 210-*a* may be spatially in between beam 205-*a* and beam 205-*b*, and beam 205-*b* may be spatially in between beam 210-*a* and beam 210-*b*.

As illustrated in FIG. 2, the first set of beams may include two sets of interleaved beams, beams 205-*a* and 205-*b*, and the second set of beams may include two beams 210-*a* and 210-*b*. In this way, the first and second sets of beams may be spread to cover a larger area or angular spread. In other examples, more than two beams may be included in the first and second set of beams. For example, base station 105-*a* may support eight antenna ports for beamforming, and the first set of beams may include eight beams 205 that are spatially interleaved with a second set of beams that may also include eight beams 210. In some examples, each of beams 205 may alternate with each of beams 210, such that a first of beam 205 may be oriented at a first angle, a first of beam 210 may be oriented at a second angle, such that the first of beams 210 may be adjacent to (e.g., contiguous with) the first of beams 205, followed at a next radial angle by a second of beams 205 that is oriented at a third angle adjacent to (e.g., contiguous with) the first of beams 210, followed at a next radial angle by a second of beams 210 that is oriented at a fourth angle adjacent to (e.g., contiguous with) the second of beams 205, and so on. As such, the first set of beams may have an angular spread about a vertical axis of the base station that is approximately the same as the angular spread of the second set of beams about the vertical axis of the base station. For example each of the first set of beams and the second set of beams may have an angular spread of about 60° to 90°. In some examples, the combined angular spread of the spatially-interleaved first and second sets of beams may be approximately 120°.

In other examples, the first set of beams and the second set of beams may be interleaved according to other arrangements or patterns, e.g. that do not strictly alternate. For example, two of beams 205 may be followed by two of beams 210, followed by two of beams 205, followed by two of beams 210, and so on.

Other examples may include interleaving beams of the first set of beams with beams of the second set of beams in both an angular direction about the vertical axis of the base station, as well as in the vertical direction where vertical beamforming may be used. For example, a first beam 205 may by oriented above (e.g., be directed vertically higher in elevation than) first beam 210 at a first angular direction about the vertical base station axis, while a second beam 210 may by oriented above second beam 205 in a second angular direction about the vertical base station axis that is adjacent to the first angular direction. A third beam 205 may by oriented above third beam 210 in a third angular direction about the vertical base station axis that is adjacent to the second angular direction, and so on. As further described below, more than two sets of beams (e.g., three or more sets of beams) may be spatial interleaved according to other patterns, and thereby decrease latency during synchronization as further described herein.

A UE 115 may decode synchronization signals received from the base station in a beam 205 or beam 210. For example, UE 115-*a* may receive the first set of synchronization signals in the first set of directions (e.g., beams 205-*a* and 205-*b*). However, the receiving power of the first set of synchronization signals may be weak due to a low gain corresponding to the first set of directions. For example, UE 115-*a* may be oriented between the directions associated with a first beam 205-*a* and a second beam 205-*b*. UE 115-*a* may be able to decode the synchronization signals and subsequently determine a set of frequencies to transmit to base station 105-*b* (e.g., for a random access message). UE 115-*a* may additionally receive a second set of synchronization signals in the second set of directions (e.g., beams 210-*a* and 210-*b*). The synchronization signal received in the second set of directions may have a stronger power in relation to the synchronization signals received at the UE 115-*a* in the first set of directions. This may be due to a higher gain corresponding to the second set of directions, for example because UE 115-*a* may be physically oriented in the direction of one of the beams 210, such as beam 210-*a* as illustrated in FIG. 2. UE 115-*a* may then determine to allocate resources for the second symbol for a random access message transmission. Subsequently, UE 115-*a* may transmit the random access message. The random access message may be transmitted in the direction of the received synchronization signals for the second symbol period.

In other examples, base station 105-*a* may monitor for beams 205 in a first set of directions, and may monitor for beams 210 in a second set of direction (e.g., during a random access subframe), where the second set of beam directions may be spatially interleaved with the first set of beam directions. For example, the monitoring may include the base station altering antenna parameters (e.g., phase and amplitude) for a number of antenna elements in an antenna array to listen for signals at a particular time and frequency from UEs that may also have implemented beamforming to transmit to the base station 105-*a*. In some examples, UE 115-*a* may transmit a random access signal (e.g., an access request) that may be part of a random access subframe. Similar to the transmission of beams 205 in a first set of directions and beams 210 in a second set of directions, base station 105-*a* may monitor in such directions where the beams are spatially interleaved in an angular direction about the vertical axis of the base station 105-*a* (e.g., by alternating beams, or according to another beam pattern). In other examples, the first and second set of beams may also be vertically interleaved (e.g., alternating, or according to another pattern).

In some examples, UE 115-*a* may have received one or more synchronization signals from base station 105-*a* as further described above, and transmit an access request or other signaling to base station 105-*a* during the random access subframe in response to the synchronization signals.

As described above, base station 105-*a* may transmit or monitor using a first set of beams in a first symbol period and transmit or monitor using a second set of beams in a second symbol period. In some case, the symbol periods may be adjacent symbol periods in a subframe (e.g., a synchronization subframe for transmission, or a random access subframe for monitoring). For example, a first symbol period of a subframe to transmit on a first set of beams may be immediately adjacent to a second symbol period of the subframe to transmit using a second set of beams, as described above. In other examples, the first set of beams may be used to transmit synchronization signals in both the first and second symbol periods of the subframe, while the second set of beams may be used to transmit synchronization signals in both a third and a fourth symbol periods of the subframe, for example to increase the likelihood of successful decoding by a UE 115 if conditions are determined to be poor or otherwise suboptimal. In still other examples, the first set of beams may be used to transmit synchronization signals in the first symbol period of the subframe, while the second set of beams may be used to transmit synchronization signals in a third symbol period of the subframe, while other signals or padding are transmitted in the second symbol period of the subframe. In accordance with aspects described above the first symbol may be a symbol having an index other than [0] in a subframe, and a second symbol may not be a symbol having an index other than [1] in a subframe (e.g., even where the symbol periods are adjacent in a subframe, they may be at other indices, such as symbol indices [4] and [5], of a synchronization subframe). Although described with reference to transmitting in a synchronization subframe, in some examples monitoring (e.g., for a random access subframe) may also use non-adjacent symbol periods, or signals may be monitored for in a single set of beam direction across more than one (e.g., two) symbol periods of the subframe.

Figure 3:
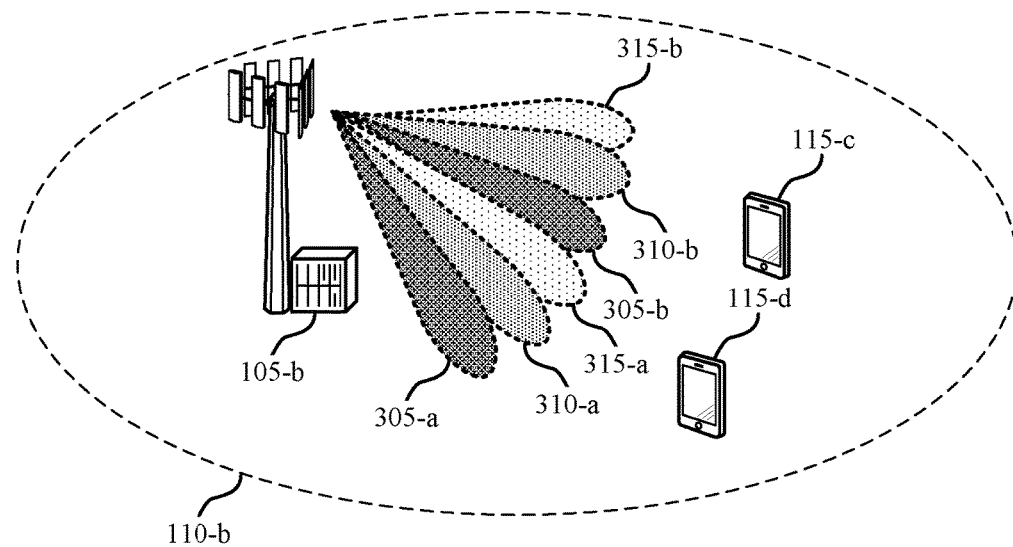
FIG. 3 illustrates an example of a wireless communications system for interleaved beam sweeping for synchronization and random access procedures in accordance with aspects of the present disclosure.
Figure 3:
Figure 3:
Figure 3:
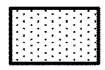
Figure 3:

FIG. 3 illustrates an example of a wireless communications system 300 for interleaved beam sweeping for synchronization and random access procedures. In some cases, wireless communications system 300 may represent aspects of techniques performed by a UE 115 or base station 105 as described with reference to FIGS. 1-2. Spatially interleaved sets of beams, including a first set of beams 305 in a first symbol period, interleaved with a second set of beams 310 in a second symbol period and a third set of beams 315 in a third symbol period, may be used to transmit in a synchronization subframe and/or monitor for access requests in a random access subframe.

Interleaved sweeping procedures may reduce latency in synchronization signal communications to a UE. Base station 105-b may configure a first set of beam directions for a synchronization signal to be broadcast to UEs 115-c and 115-d. Base station 105-b may perform this transmission using interleaved sweeping of beamformed beams. The base station may schedule to transmit a first set of synchronization signals over a first symbol period of a synchronization subframe, a second set of synchronization signals over a second symbol period of the synchronization subframe, and a third set of synchronization signals over a third symbol period of the synchronization subframe. For the first set of synchronization signals, base station 105-b may transmit the synchronization signals in a first set of beams (e.g., beams 305-a and 305-b) in a first symbol period, where the first set of beams correspond to a first set of directions. For the second symbol period, base station 105-b may transmit the second set of synchronization signals in a second set of beams (e.g., beams 310-a and 310-b), where the second set of beams may correspond to a second set of beam directions. Beams of the first direction may radially alternate with beams of the second direction and beams of a third direction. For example, beam 310-a may be between beams 305-a and 315-a. In this way, the first and second sets of beams may be spread further apart to cover a larger area. Additionally, the first set of synchronization signals may be also transmitted in beams of the third set of directions (e.g., beams 315-a and 315-b), which may allow for the first set of synchronization signals to be transmitted in contiguous beams. Alternatively, the third set of beams directions may be used to transmit a third set of synchronization signals, which may allow for non-contiguous transmission of the sets of synchronization signals.

In other examples, base station 105-b may monitor for beams 305 in a first set of directions (e.g., during a random access subframe), may monitor for beams 310 in a second set of directions, and may monitor for beams 315 in a third set of directions, where the second set of beam directions may be spatially interleaved with the first set of beam directions, and the third set of beam directions may be spatially interleaved with the first and second set of beam directions.

Figure 4:
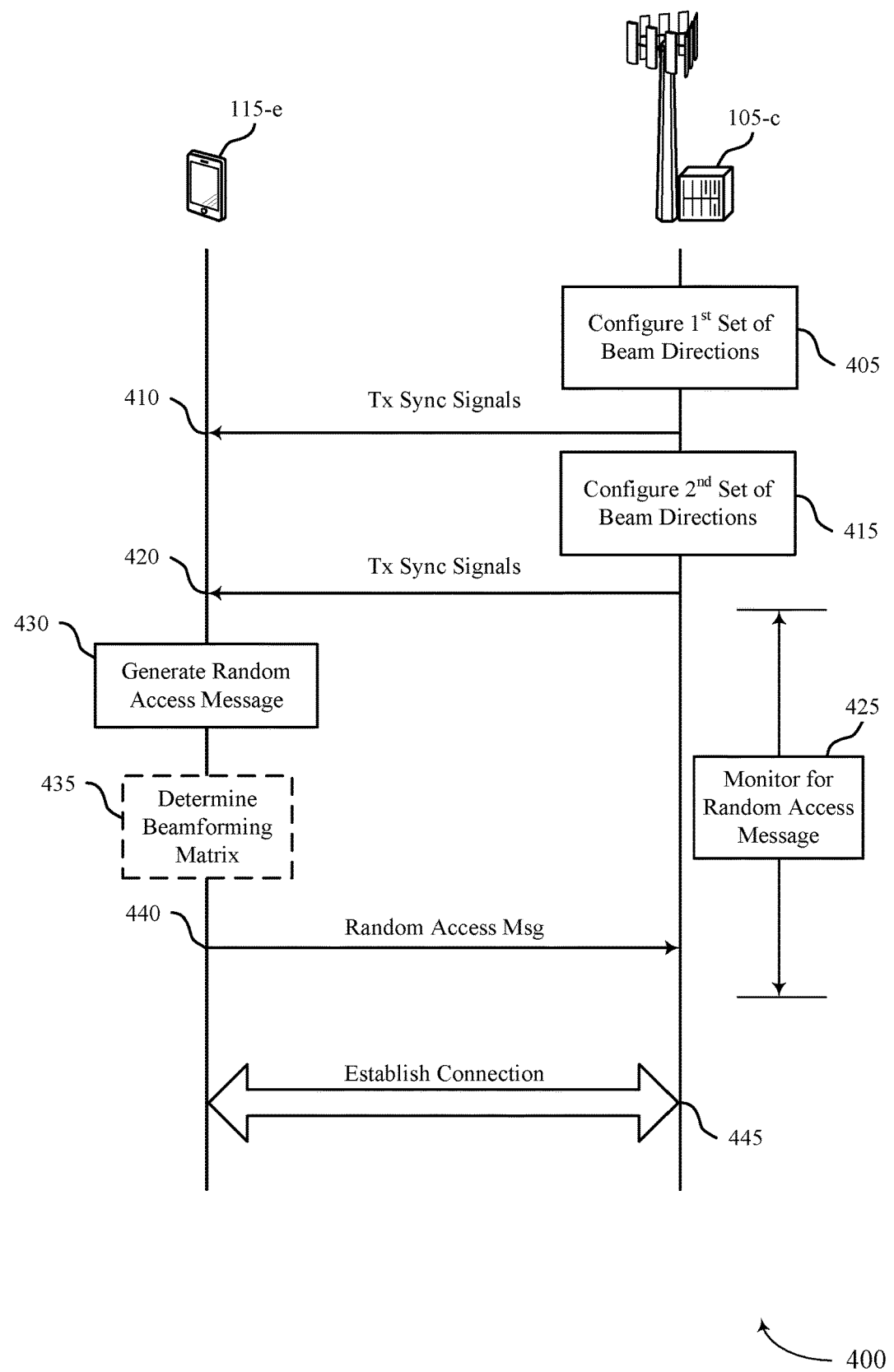
FIG. 4 illustrates an example of a process flow for interleaved beam sweeping for synchronization and random access procedures in accordance with various aspects of the present disclosure.

FIG. 4 illustrates an example of a process flow 400 for interleaved beam sweeping for synchronization and random access procedures in accordance with various aspects of the present disclosure. Process flow 400 may include base station 105-c and UE 115-e, which may be examples of the corresponding devices described with reference to FIGS. 1 through 3.

At 405, base station 105-c may configure a first set of beam directions for transmission of a first set of synchronization signals. At 410, base station 105-c may transmit the first set of synchronization signals using the first set of beam directions. At 415, base station 105-c may configure a second set of beam directions for transmission of a second set of synchronization signals. In some examples, base station 105-c may enable or otherwise prepare an antenna array to transmit in the first or second sets of beam directions to configure the first set of beam directions at 405 or configure the second set of beam directions at 415. The second set of beam directions may alternate radially with the first set of beam directions. Additionally, each beam direction of the first set of beam directions may be non-contiguous with each other beam direction of the first set of beam directions. At 420, base station 105-c may transmit the second set of synchronization signals using the second set of beam directions. During period 425, which may be at or after the transmission of the second set of synchronization signals at 425, base station 105-c may monitor for a random access message from UE 115-e. Additionally, base station 105-c may monitor the set of directions corresponding to the beamforming pattern. At 430, UE 115-e may generate a random access message. At step 435, UE 115-e may optionally determine a beamforming matrix for an access request. UE 115-e may determine the beamforming matrix based at least in part on the second set of synchronization signals. At step 440, UE 115-e may transmit the generated random access message to base station 105-c. At 445, base station 105-c and UE 115-e may establish a connection, based at least in part on the random access message received by base station 105-c.

Figure 5:
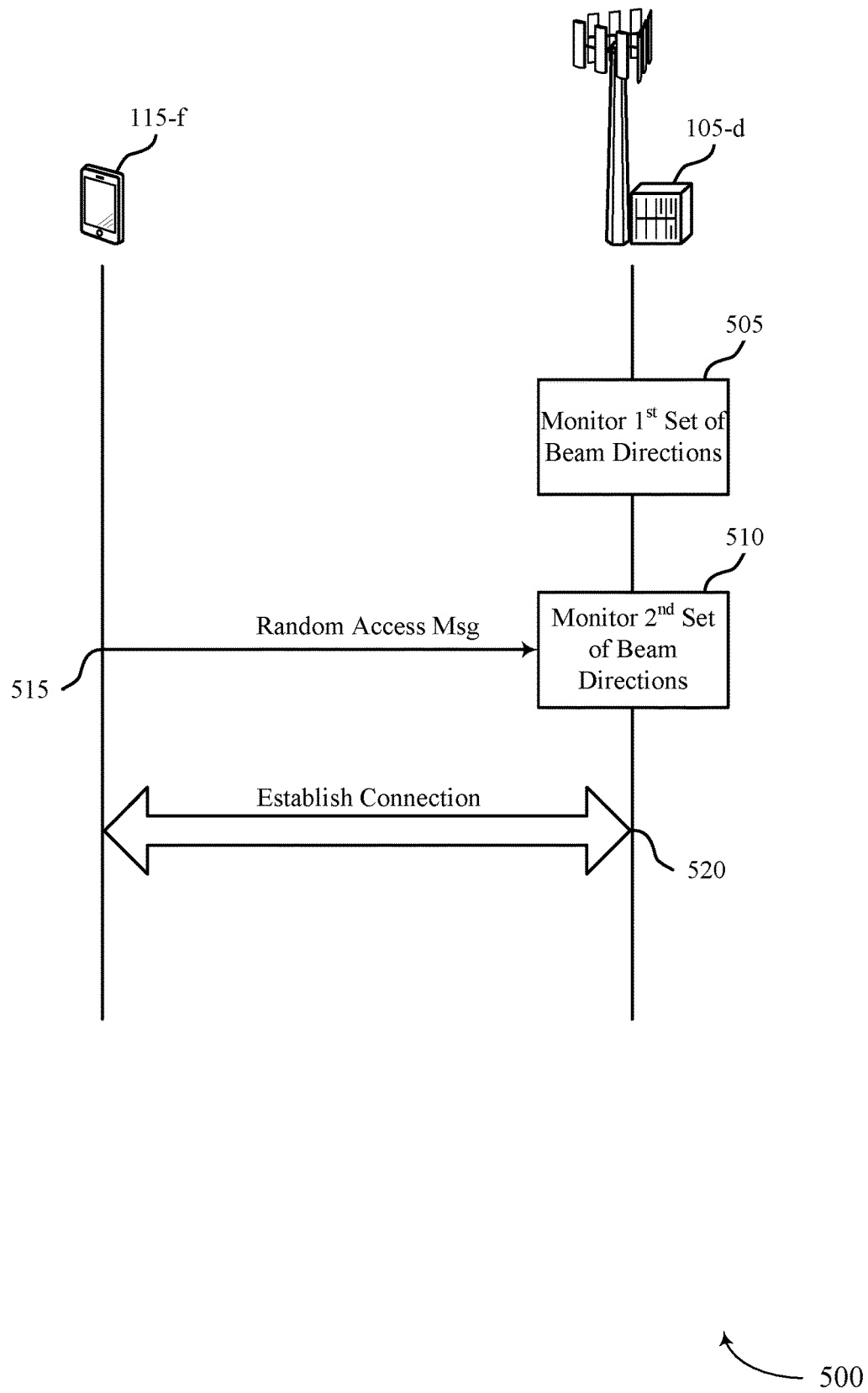
FIG. 5 illustrates an example of a process flow in a system that supports interleaved beam sweeping for synchronization and random access procedures in accordance with aspects of the present disclosure.

FIG. 5 illustrates an example of a process flow 500 for interleaved beam sweeping for synchronization and random access procedures in accordance with various aspects of the present disclosure. Process flow 500 may include base station 105-d and UE 115-e, which may be examples of the corresponding devices described with reference to FIGS. 1 through 3.

At 505, base station 105-d may monitor a first set of beam directions during a first symbol period of a random access subframe. Additionally, monitoring the first set of beam directions may include using multiple ports of an antenna array of base station 105-d. At 510, base station 105-d may monitor a second set of beam direction during a second symbol period of the random access subframe. The second set of beam directions may be spatially interleaved with the first set of beam directions. Additionally or alternatively, the second set of beam directions may alternate radially with the first set of beam directions. Additionally or alternatively, each beam of the first set of beam directions may be non-contiguous with each other beam direction of the first set of beam directions. At 515, UE 115-*f* may transmit a random access signal to base station 105-*d* during the second symbol period. At 520, base station 105-*d* and UE 115-*f* may establish a connection, based at least in part on the random access message received by base station 105-*d* at 515.

Figure 6:
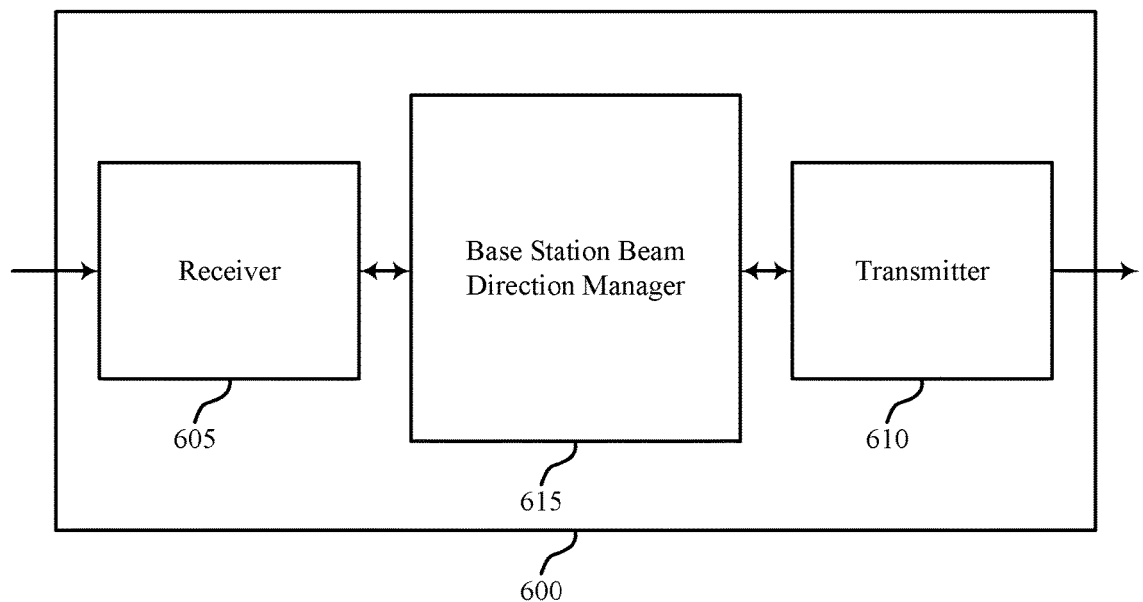
FIGS. 6 through 8 show block diagrams of a wireless device that supports interleaved beam sweeping for synchronization and random access procedures in accordance with aspects of the present disclosure.

FIG. 6 shows a block diagram of a wireless device 600 that supports interleaved beam sweeping for synchronization and random access procedures in accordance with various aspects of the present disclosure. Wireless device 600 may be an example of aspects of a base station 105 described with reference to FIGS. 1 through 5. Wireless device 600 may include receiver 605, transmitter 610 and base station beam direction manager 615. Wireless device 600 may also include a processor and/or memory. Each of these components may be in communication with each other.

The receiver 605 may receive information such as packets, user data, or control information associated with various information channels (e.g., control channels, data channels, and information related to interleaved beam sweeping for synchronization and random access, etc.). Information may be passed on to other components of the device. The receiver 605 may be an example of aspects of the transceiver 925 described with reference to FIG. 9.

The transmitter 610 may transmit signals received from other components of wireless device 600. In some examples, the transmitter 610 may be collocated with a receiver in a transceiver module. For example, the transmitter 610 may be an example of aspects of the transceiver 925 described with reference to FIG. 9. The transmitter 610 may include multiple antennas or antenna elements, for example arranged as an antenna array having multiple ports that may be used for beamforming, including transmitting one or more beams in a particular beam direction or set of beam directions using beamforming techniques as described herein.

The base station beam direction manager 615 may monitor a first set of beam directions during a first symbol period of a random access subframe, monitor a second set of beam directions during a second symbol period of the random access subframe, the second set of beam directions spatially interleaved with the first set of beam directions, transmit a first set of synchronization signals in a first set of beam directions during a first symbol period of a synchronization subframe, and transmit a second set of synchronization signals in a second set of beam directions during a second symbol period of the synchronization subframe, the second set of beam directions spatially interleaved with the first set of beam directions, and the first symbol period preceding the second symbol period in the synchronization subframe. The base station beam direction manager 615 may also be an example of aspects of the base station beam direction manager 905 described with reference to FIG. 9.

Figure 7:
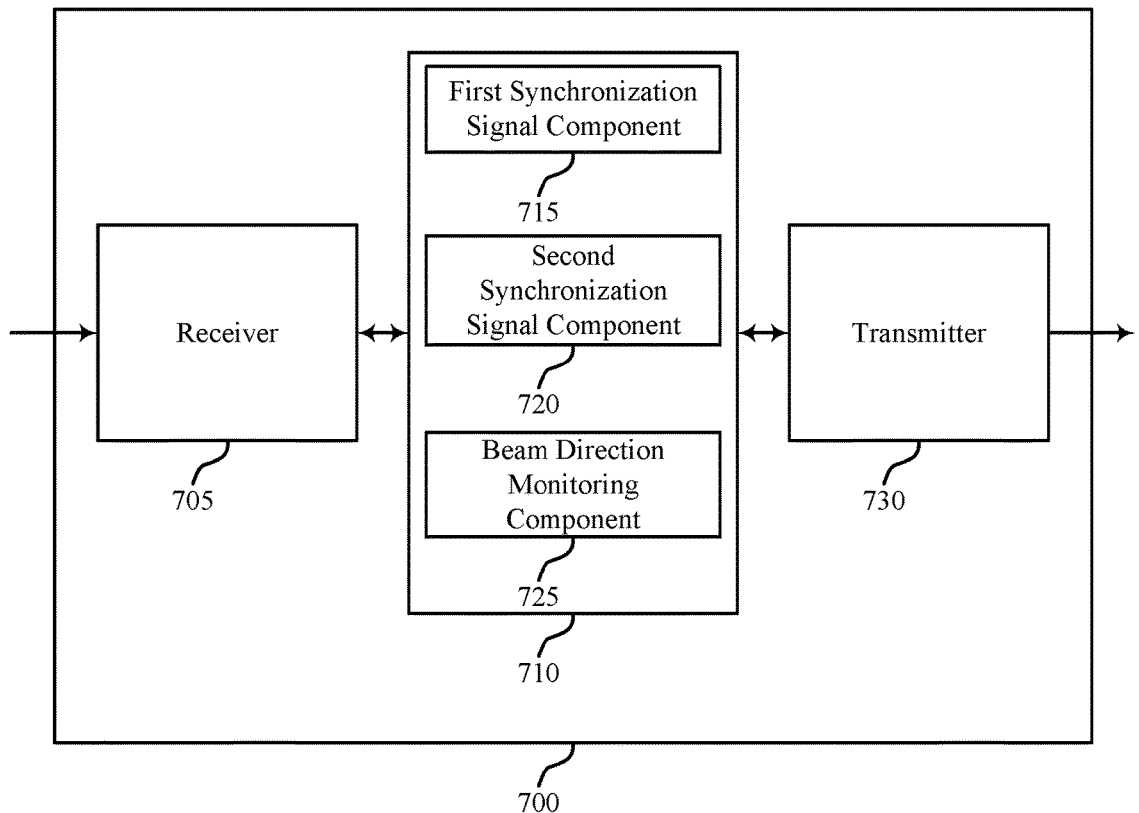

FIG. 7 shows a block diagram of a wireless device 700 that supports interleaved beam sweeping for synchronization and random access procedures in accordance with various aspects of the present disclosure. Wireless device 700 may be an example of aspects of a wireless device 600 or a base station 105 described with reference to FIGS. 1 through 6. Wireless device 700 may include receiver 705, base station beam direction manager 710 and transmitter 730. Wireless device 700 may also include a processor and/or memory. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The base station beam direction manager 710 may be an example of aspects of base station beam direction manager 615 described with reference to FIG. 6. The base station beam direction manager 710 may include first synchronization signal component 715, second synchronization signal component 720 and beam direction monitoring component 725. The base station beam direction manager 710 may be an example of aspects of the base station beam direction manager 905 described with reference to FIG. 9.

The first synchronization signal component 715 may transmit, during a third symbol period of the synchronization subframe, the first set of synchronization signals in the first set of beam directions, and transmit a first set of synchronization signals in a first set of beam directions during a first symbol period of a synchronization subframe. In some cases, each beam direction of the first set of beam directions may be non-contiguous with each other beam direction of the first set of beam directions. In some cases, the third symbol period is contiguous with the first symbol period. In some cases, transmitting the first set of synchronization signals includes transmitting the first set of synchronization signals using a set of ports of an antenna array of the base station.

The second synchronization signal component 720 may transmit the second set of synchronization signals using the set of ports of the antenna array, and transmit a second set of synchronization signals in a second set of beam directions during a second symbol period of the synchronization subframe, the second set of beam directions spatially interleaved with the first set of beam directions. In some cases, the second set of beam directions may alternate radially with the first set of beam directions.

The beam direction monitoring component 725 may monitor a first set of beam directions during a first symbol period of a random access subframe, and monitor a second set of beam directions during a second symbol period of the random access subframe, where the second set of beam directions may be spatially interleaved with the first set of beam directions, and monitor a third set of beam directions during a third symbol period of the random access subframe, where the third set of beam directions may be spatially interleaved with the first set of beam directions and the second set of beam directions.

In some cases, the second set of beam directions may alternate radially with the first set of beam directions. In some cases, each beam direction of the first set of beam directions are non-contiguous with each other beam direction of the first set of beam directions. In some cases, monitoring the first set of beam directions includes monitoring the first set of beam directions using a set of ports of an antenna array of the base station during the first symbol period.

The transmitter 730 may transmit signals received from other components of wireless device 700. In some examples, the transmitter 730 may be collocated with a receiver in a transceiver module. For example, the transmitter 730 may be an example of aspects of the transceiver 925 described with reference to FIG. 9. The transmitter 730 may utilize a single antenna, or it may utilize multiple antennas.

Figure 8:
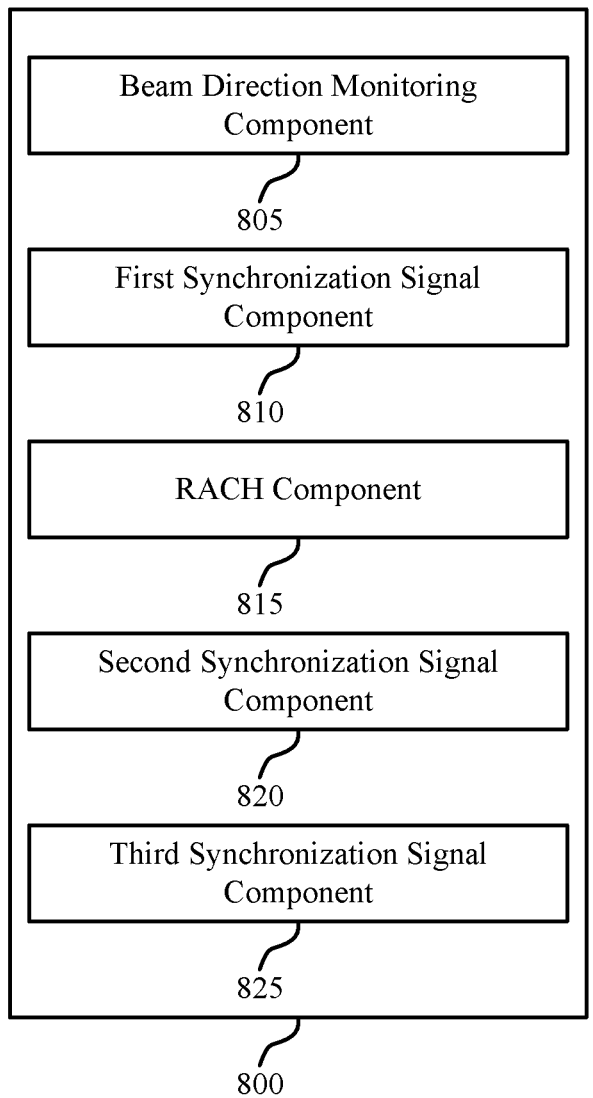

FIG. 8 shows a block diagram of a base station beam direction manager 800 which may be an example of the corresponding component of wireless device 600 or wireless device 700. That is, base station beam direction manager 800 may be an example of aspects of base station beam direction manager 615 or base station beam direction manager 710 described with reference to FIGS. 6 and 7. The base station beam direction manager 800 may also be an example of aspects of the base station beam direction manager 905 described with reference to FIG. 9.

The base station beam direction manager 800 may include beam direction monitoring component 805, first synchronization signal component 810, RACH component 815, second synchronization signal component 820 and third synchronization signal component 825. Each of these components may communicate, directly or indirectly, with one another (e.g., via one or more buses).

The beam direction monitoring component 805 may monitor a first set of beam directions during a first symbol period of a random access subframe, monitor a second set of beam directions during a second symbol period of the random access subframe, where the second set of beam directions may be spatially interleaved with the first set of beam directions, and monitor a third set of beam directions during a third symbol period of the random access subframe, where the third set of beam directions may be spatially interleaved with the first set of beam directions and the second set of beam directions.

The first synchronization signal component 810 may transmit, during a third symbol period of the synchronization subframe, the first set of synchronization signals in the first set of beam directions, and transmit a first set of synchronization signals in a first set of beam directions during a first symbol period of a synchronization subframe.

The RACH component 815 may receive a first random access signal during the first symbol period from a first UE, and receive a random access signal from a UE based on a synchronization signal of the first set of synchronization signals received by the UE.

The second synchronization signal component 820 may transmit the second set of synchronization signals using the set of ports of the antenna array, and transmit a second set of synchronization signals in a second set of beam directions during a second symbol period of the synchronization subframe, the second set of beam directions spatially interleaved with the first set of beam directions.

The third synchronization signal component 825 may transmit a third set of synchronization signals in a third set of beam directions during a third symbol period of the synchronization subframe, the third set of beam directions spatially interleaved with the first set of beam directions and the second set of beam directions.

Figure 9:
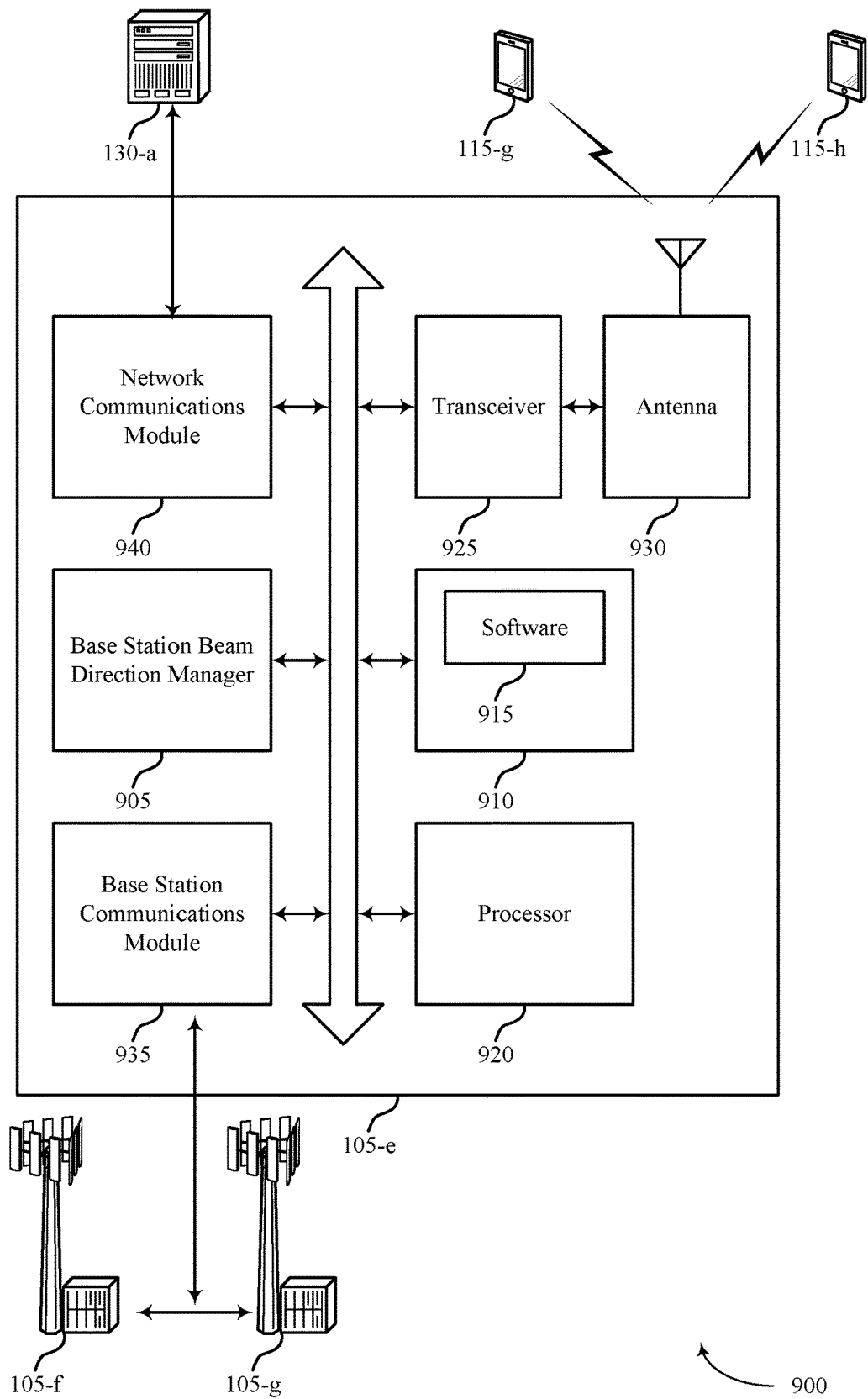
FIG. 9 illustrates a block diagram of a system including a base station that supports interleaved beam sweeping for synchronization and random access procedures in accordance with aspects of the present disclosure.

FIG. 9 shows a diagram of a wireless system 900 including a device configuration that supports interleaved beam sweeping for synchronization and random access procedures in accordance with various aspects of the present disclosure. For example, wireless system 900 may include base station 105-*e*, which may be an example of a wireless device 600, a wireless device 700, or a base station 105 as described with reference to FIGS. 1 through 8.

Base station 105-*e* may also include components for bi-directional voice and data communications including components for transmitting communications and components for receiving communications. For example, base station 105-*e* may communicate bi-directionally with one or more UEs 115.

Base station 105-*e* may also include base station beam direction manager 905, memory 910, processor 920, transceiver 925, antenna 930, base station communications module 935 and network communications module 940. Each of these modules may communicate, directly or indirectly, with one another (e.g., via one or more buses). The base station beam direction manager 905 may be an example of a base station beam direction manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., interleaved beam sweeping for synchronization and random access procedures, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.)

The transceiver 925 may communicate bi-directionally, via one or more antennas or antenna arrays, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna 930, which may be capable of concurrently transmitting or receiving multiple wireless transmissions. Antenna 930 may include one or more antennas or antenna elements, for example arranged as an antenna array having multiple ports that may be used for beamforming, including transmitting one or more beams in a particular beam direction or set of beam directions using beamforming techniques as described herein.

The base station communications module 935 may manage communications with other base station 105, and may include a controller or scheduler for controlling communications with UEs 115 in cooperation with other base stations 105. For example, the base station communications module 935 may coordinate scheduling for transmissions to UEs 115 for various interference mitigation techniques such as beamforming or joint transmission. In some examples, base station communications module 935 may provide an X2 interface within an LTE/LTE-A wireless communication network technology to provide communication between base stations 105.

The network communications module 940 may manage communications with the core network (e.g., via one or more wired backhaul links). For example, the network communications module 940 may manage the transfer of data communications for client devices, such as one or more UEs 115.

Figure 10:
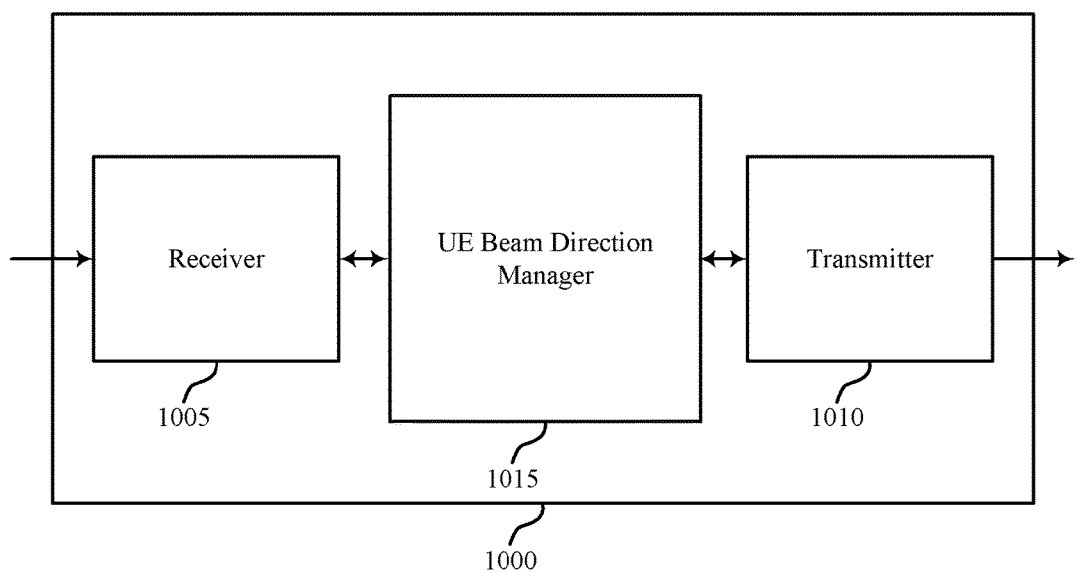
FIGS. 10 through 12 show block diagrams of a wireless device that supports interleaved beam sweeping for synchronization and random access procedures in accordance with aspects of the present disclosure.

FIG. 10 shows a block diagram of a wireless device 1000 that supports interleaved beam sweeping for synchronization and random access procedures in accordance with various aspects of the present disclosure. Wireless device 1000 may be an example of aspects of a UE 115 described with reference to FIGS. 1 through 5. Wireless device 1000 may include receiver 1005, transmitter 1010 and UE beam direction manager 1015. Wireless device 1000 may also include a processor and/or memory. Each of these components may be in communication with each other.

The receiver 1005 may receive information such as packets, user data, or control information associated with various information channels (e.g., control channels, data channels, and information related to interleaved beam sweeping for synchronization and random access, etc.). Information may be passed on to other components of the device. The receiver 1005 may be an example of aspects of the transceiver 1325 described with reference to FIG. 13.

The transmitter 1010 may transmit signals received from other components of wireless device 1000. In some examples, the transmitter 1010 may be collocated with a receiver in a transceiver module. For example, the transmitter 1010 may be an example of aspects of the transceiver 1325 described with reference to FIG. 13. The transmitter 1010 may include a single antenna, or it may include multiple antennas, for example arranged as an antenna array having multiple ports that may be used for beamforming, as described herein.

The UE beam direction manager 1015 may receive, from a base station, a first synchronization signal in a synchronization subframe, decode the first synchronization signal, receive, from the base station, a second synchronization signal in the synchronization subframe, the second synchronization signal having a higher power than the first synchronization signal, and transmit, to the base station, an access request based on the decoded first synchronization signal. The UE beam direction manager 1015 may also be an example of aspects of the UE beam direction manager 1305 described with reference to FIG. 13.

Figure 11:
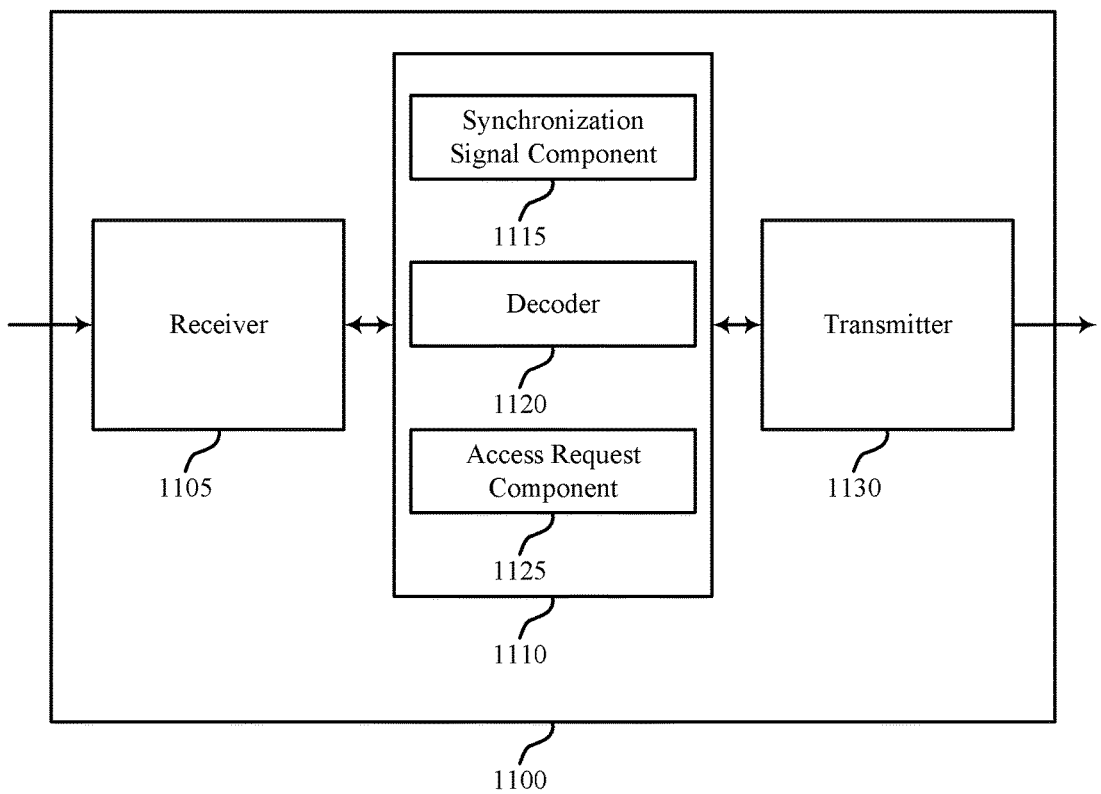

FIG. 11 shows a block diagram of a wireless device 1100 that supports interleaved beam sweeping for synchronization and random access procedures in accordance with various aspects of the present disclosure. Wireless device 1100 may be an example of aspects of a wireless device 1000 or a UE 115 described with reference to FIGS. 1 through 5, and 10. Wireless device 1100 may include receiver 1105, UE beam direction manager 1110 and transmitter 1130. Wireless device 1100 may also include a processor and/or memory. Each of these components may be in communication with each other.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13.

The UE beam direction manager 1110 may be an example of aspects of UE beam direction manager 1015 described with reference to FIG. 10. The UE beam direction manager 1110 may include synchronization signal component 1115, decoder 1120 and access request component 1125. The UE beam direction manager 1110 may be an example of aspects of the UE beam direction manager 1305 described with reference to FIG. 13.

The synchronization signal component 1115 may receive, from a base station, a first synchronization signal in a synchronization subframe, and receive, from the base station, a second synchronization signal in the synchronization subframe, the second synchronization signal having a higher power than the first synchronization signal.

The decoder 1120 may decode the first synchronization signal. The access request component 1125 may transmit, to the base station, an access request based on the decoded first synchronization signal.

The transmitter 1130 may transmit signals received from other components of wireless device 1100. In some examples, the transmitter 1130 may be collocated with a receiver in a transceiver module. For example, the transmitter 1130 may be an example of aspects of the transceiver 1325 described with reference to FIG. 13. The transmitter 1130 may utilize a single antenna, or it may utilize multiple antennas.

Figure 12:
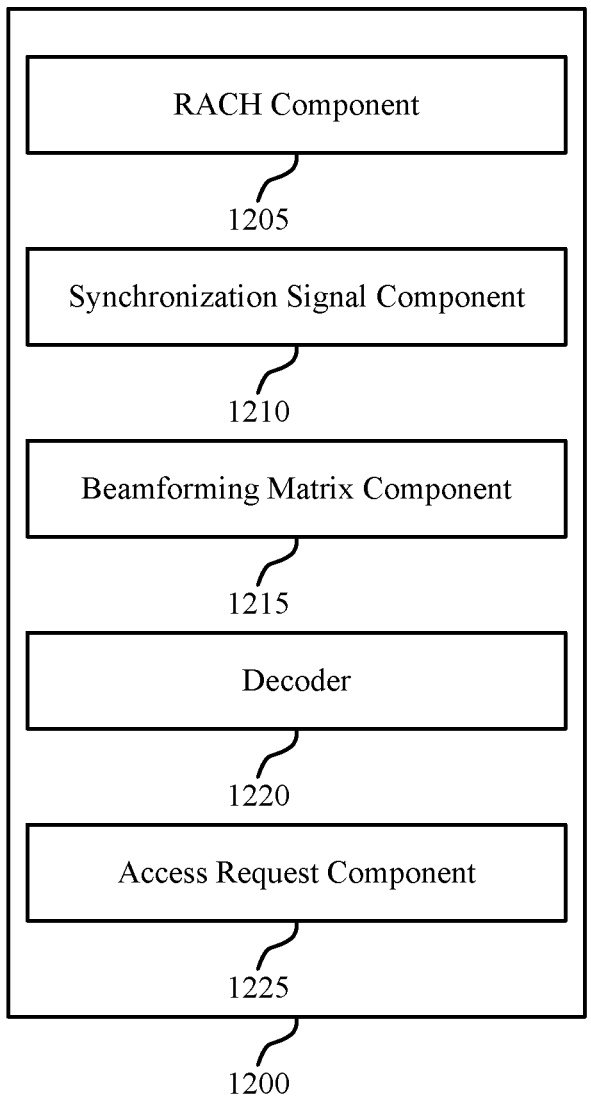

FIG. 12 shows a block diagram of a UE beam direction manager 1200 which may be an example of the corresponding component of wireless device 1000 or wireless device 1100. That is, UE beam direction manager 1200 may be an example of aspects of UE beam direction manager 1015 or UE beam direction manager 1110 described with reference to FIGS. 10 and 11. The UE beam direction manager 1200 may also be an example of aspects of the UE beam direction manager 1305 described with reference to FIG. 13.

The UE beam direction manager 1200 may include RACH component 1205, synchronization signal component 1210, beamforming matrix component 1215, decoder 1220 and access request component 1225. Each of these modules may communicate, directly or indirectly, with one another (e.g., via one or more buses).

The RACH component 1205 may transmit a random access subframe that includes an access request. The synchronization signal component 1210 may receive, from a base station, a first synchronization signal in a synchronization subframe, and receive, from the base station, a second synchronization signal in the synchronization subframe, the second synchronization signal having a higher power than the first synchronization signal.

The beamforming matrix component 1215 may determine a beamforming matrix for the access request based on the first synchronization signal or the second synchronization signal. The decoder 1220 may decode the first synchronization signal. The access request component 1225 may transmit, to the base station, an access request based on the decoded first synchronization signal.

Figure 13:
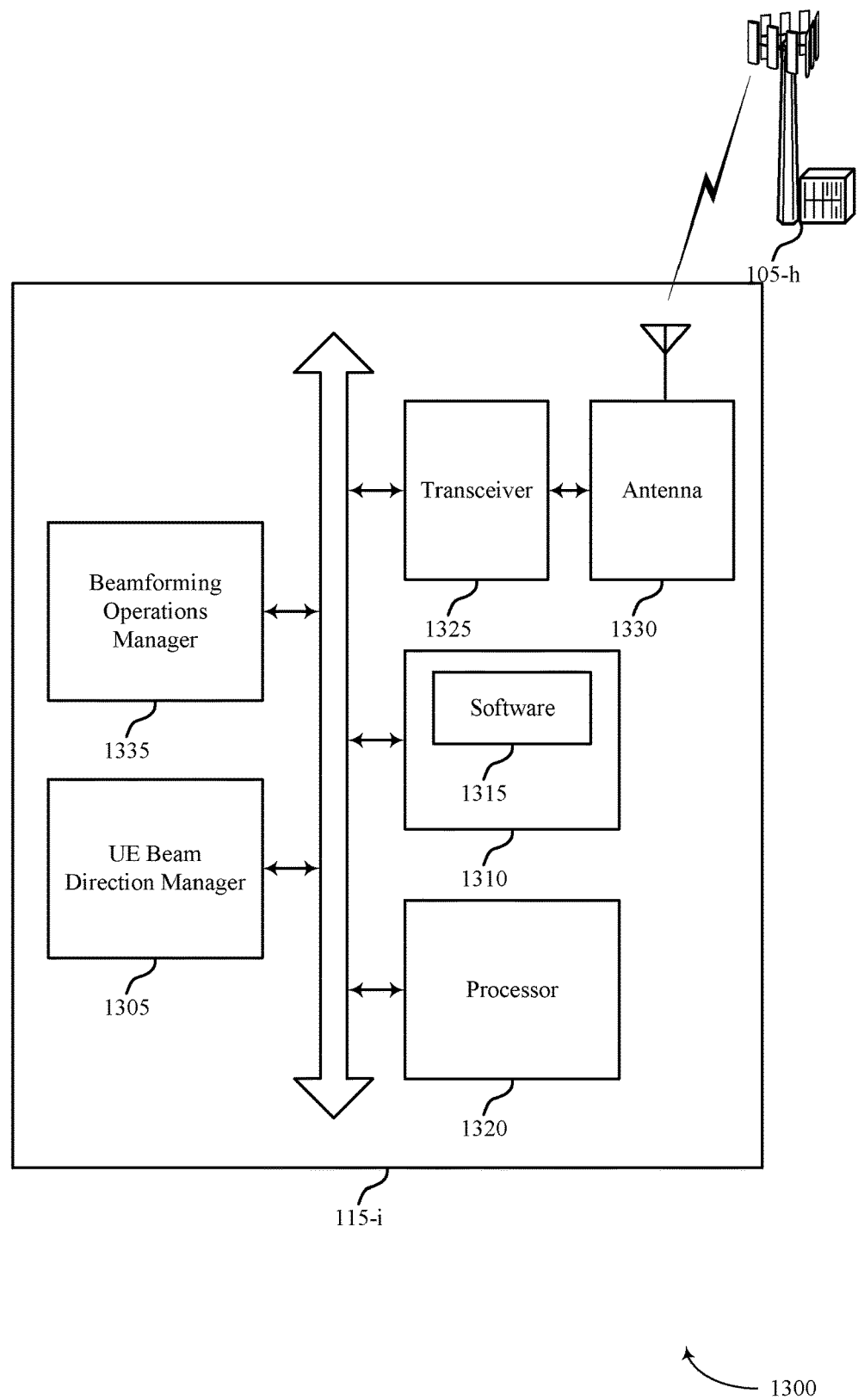
FIG. 13 illustrates a block diagram of a system including a UE that supports interleaved beam sweeping for synchronization and random access procedures in accordance with aspects of the present disclosure.

FIG. 13 shows a diagram of a system 1300 including a device that supports interleaved beam sweeping for synchronization and random access procedures in accordance with various aspects of the present disclosure. For example, system 1300 may include UE 115-i, which may be an example of a wireless device 1000, a wireless device 1100, or a UE 115 as described with reference to FIGS. 1 through 5, and 10 through 12.

UE 115-i may also include UE beam direction manager 1305, memory 1310, processor 1320, transceiver 1325, antenna 1330 and beamforming operations module 1335. Each of these modules may communicate, directly or indirectly, with one another (e.g., via one or more buses). The UE beam direction manager 1305 may be an example of a UE beam direction manager as described with reference to FIGS. 10 through 12.

The memory 1310 may include RAM and ROM. The memory 1310 may store computer-readable, computer-executable software including instructions that, when executed, cause the processor to perform various functions described herein (e.g., interleaved beam sweeping for synchronization and random access, etc.). In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.)

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas. In some cases, the wireless device may include a single antenna 1330. However, in some cases the device may have more than one antenna 930, which may be capable of concurrently transmitting or receiving multiple wireless transmissions.

Beamforming operations module 1335 may enable UE 115-*c* to send and receive transmissions using beamforming techniques (e.g., directional transmissions using an array of antennas).

Figure 14:
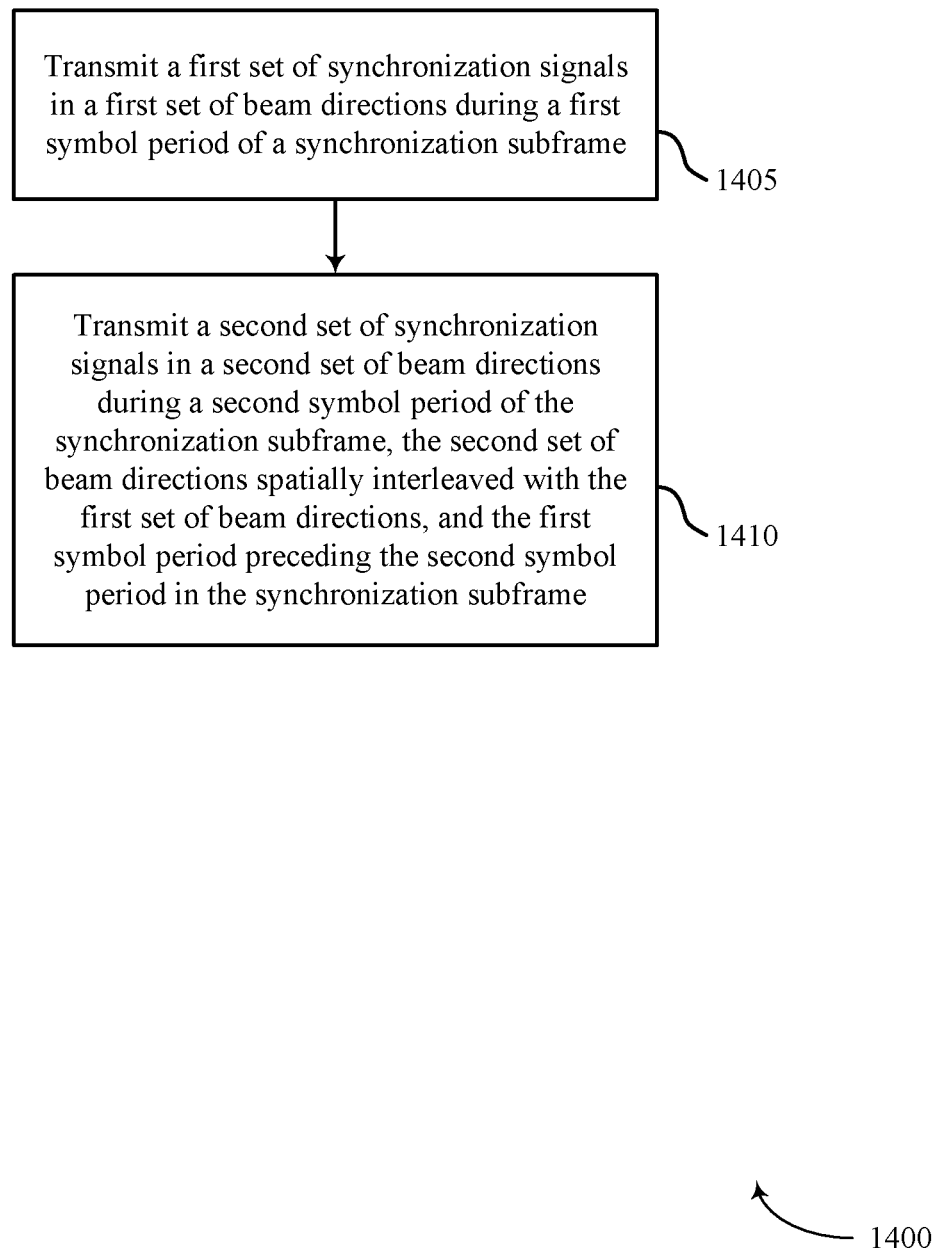
FIGS. 14 through 20 illustrate methods for interleaved beam sweeping for synchronization and random access procedures in accordance with aspects of the present disclosure.

FIG. 14 shows a flowchart illustrating a method 1400 for interleaved beam sweeping for synchronization and random access procedures in accordance with various aspects of the present disclosure. The operations of method 1400 may be implemented by a device such as a base station 105 or its components as described with reference to FIGS. 1 through 5. For example, the operations of method 1400 may be performed by the base station beam direction manager as described herein. In some examples, the base station 105 may execute a set of codes to control the functional elements of the device to perform the functions described below. Additionally or alternatively, the base station 105 may perform aspects the functions described below using special-purpose hardware.

At block 1405, the base station 105 may transmit a first set of synchronization signals in a first set of beam directions during a first symbol period of a synchronization subframe as described above with reference to FIGS. 2 through 5. In certain examples, the operations of block 1405 may be performed by the first synchronization signal component as described with reference to FIGS. 7 and 8.

At block 1410, the base station 105 may transmit a second set of synchronization signals in a second set of beam directions during a second symbol period of the synchronization subframe, the second set of beam directions spatially interleaved with the first set of beam directions, and the first symbol period preceding the second symbol period in the synchronization subframe, as described above with reference to FIGS. 2 through 5. In certain examples, the operations of block 1410 may be performed by the second synchronization signal component as described with reference to FIGS. 7 and 8.

Figure 15:
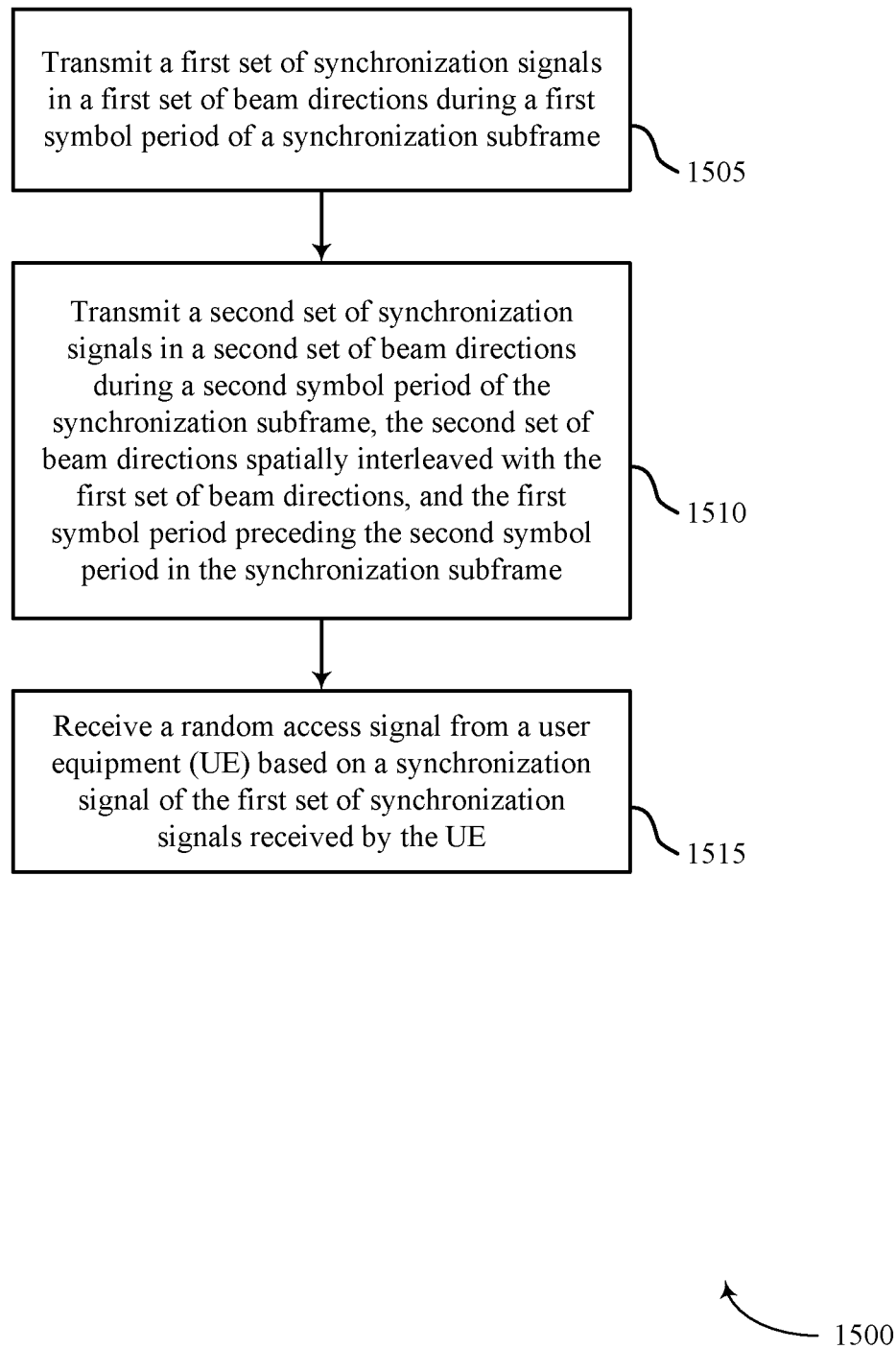

FIG. 15 shows a flowchart illustrating a method 1500 for interleaved beam sweeping for synchronization and random access procedures in accordance with various aspects of the present disclosure. The operations of method 1500 may be implemented by a device such as a base station 105 or its components as described with reference to FIGS. 1 through 5. For example, the operations of method 1500 may be performed by the base station beam direction manager as described herein. In some examples, the base station 105 may execute a set of codes to control the functional elements of the device to perform the functions described below. Additionally or alternatively, the base station 105 may perform aspects the functions described below using special-purpose hardware.

At block 1505, the base station 105 may transmit a first set of synchronization signals in a first set of beam directions during a first symbol period of a synchronization subframe as described above with reference to FIGS. 2 through 5. In certain examples, the operations of block 1505 may be performed by the first synchronization signal component as described with reference to FIGS. 7 and 8.

At block 1510, the base station 105 may transmit a second set of synchronization signals in a second set of beam directions during a second symbol period of the synchronization subframe, the second set of beam directions spatially interleaved with the first set of beam directions, and the first symbol period preceding the second symbol period in the synchronization subframe, as described above with reference to FIGS. 2 through 5. In certain examples, the operations of block 1510 may be performed by the second synchronization signal component as described with reference to FIGS. 7 and 8.

At block 1515, the base station 105 may receive a random access signal from a UE based on a synchronization signal of the first set of synchronization signals received by the UE as described above with reference to FIGS. 2 through 5. In certain examples, the operations of block 1515 may be performed by the RACH component as described with reference to FIGS. 7 and 8.

Figure 16:
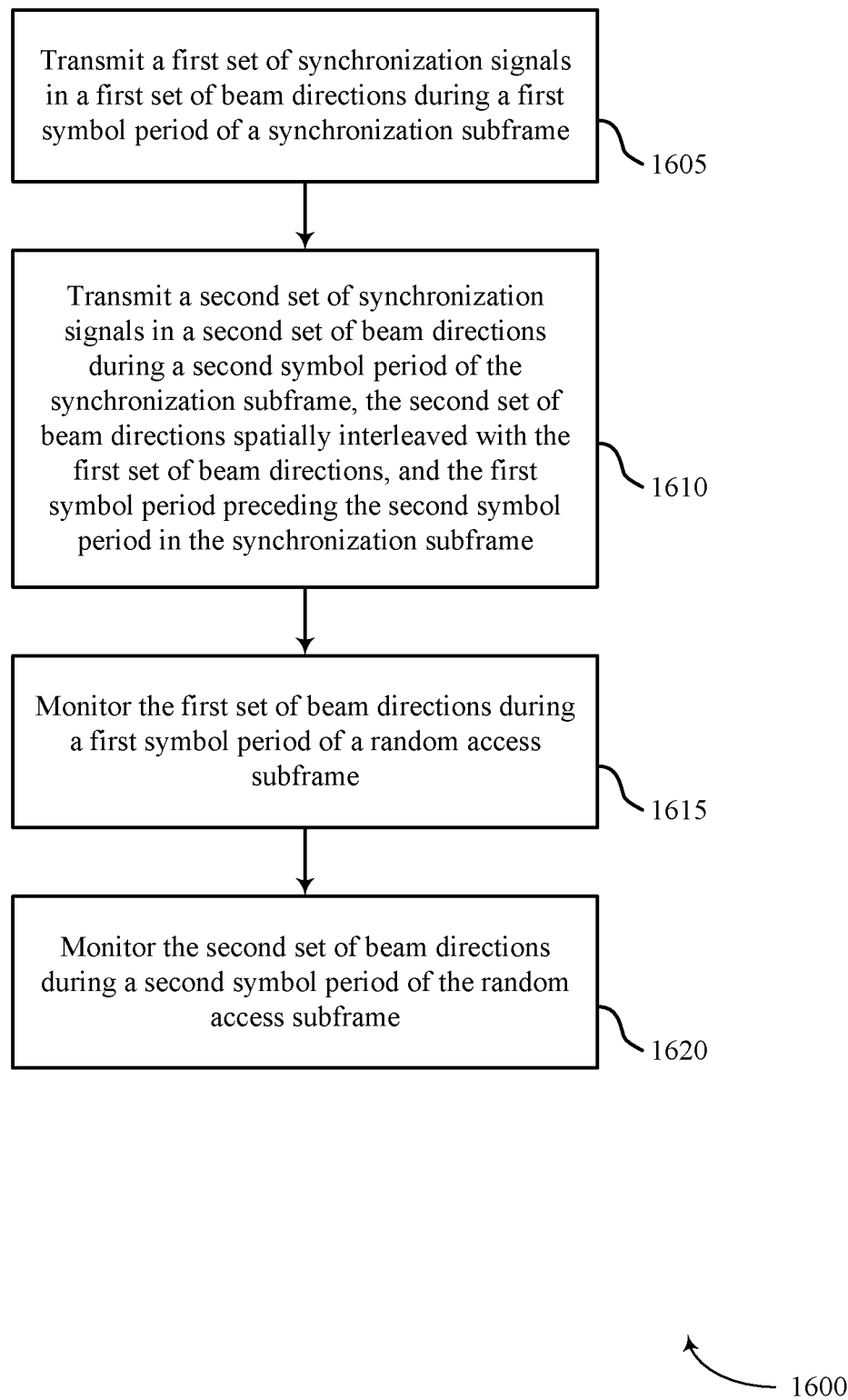

FIG. 16 shows a flowchart illustrating a method 1600 for interleaved beam sweeping for synchronization and random access procedures in accordance with various aspects of the present disclosure. The operations of method 1600 may be implemented by a device such as a base station 105 or its components as described with reference to FIGS. 1 through 5. For example, the operations of method 1600 may be performed by the base station beam direction manager as described herein. In some examples, the base station 105 may execute a set of codes to control the functional elements of the device to perform the functions described below. Additionally or alternatively, the base station 105 may perform aspects the functions described below using special-purpose hardware.

At block 1605, the base station 105 may transmit a first set of synchronization signals in a first set of beam directions during a first symbol period of a synchronization subframe as described above with reference to FIGS. 2 through 5. In certain examples, the operations of block 1605 may be performed by the first synchronization signal component as described with reference to FIGS. 7 and 8.

At block 1610, the base station 105 may transmit a second set of synchronization signals in a second set of beam directions during a second symbol period of the synchronization subframe, the second set of beam directions spatially interleaved with the first set of beam directions, and the first symbol period preceding the second symbol period in the synchronization subframe, as described above with reference to FIGS. 2 through 5. In certain examples, the operations of block 1610 may be performed by the second synchronization signal component as described with reference to FIGS. 7 and 8.

At block 1615, the base station 105 may monitor the first set of beam directions during a first symbol period of a random access subframe as described above with reference to FIGS. 2 through 5. In certain examples, the operations of block 1615 may be performed by the beam direction monitoring component as described with reference to FIGS. 7 and 8.

At block 1620, the base station 105 may monitor the second set of beam directions during a second symbol period of the random access subframe as described above with reference to FIGS. 2 through 5. In certain examples, the operations of block 1620 may be performed by the beam direction monitoring component as described with reference to FIGS. 7 and 8.

Figure 17:
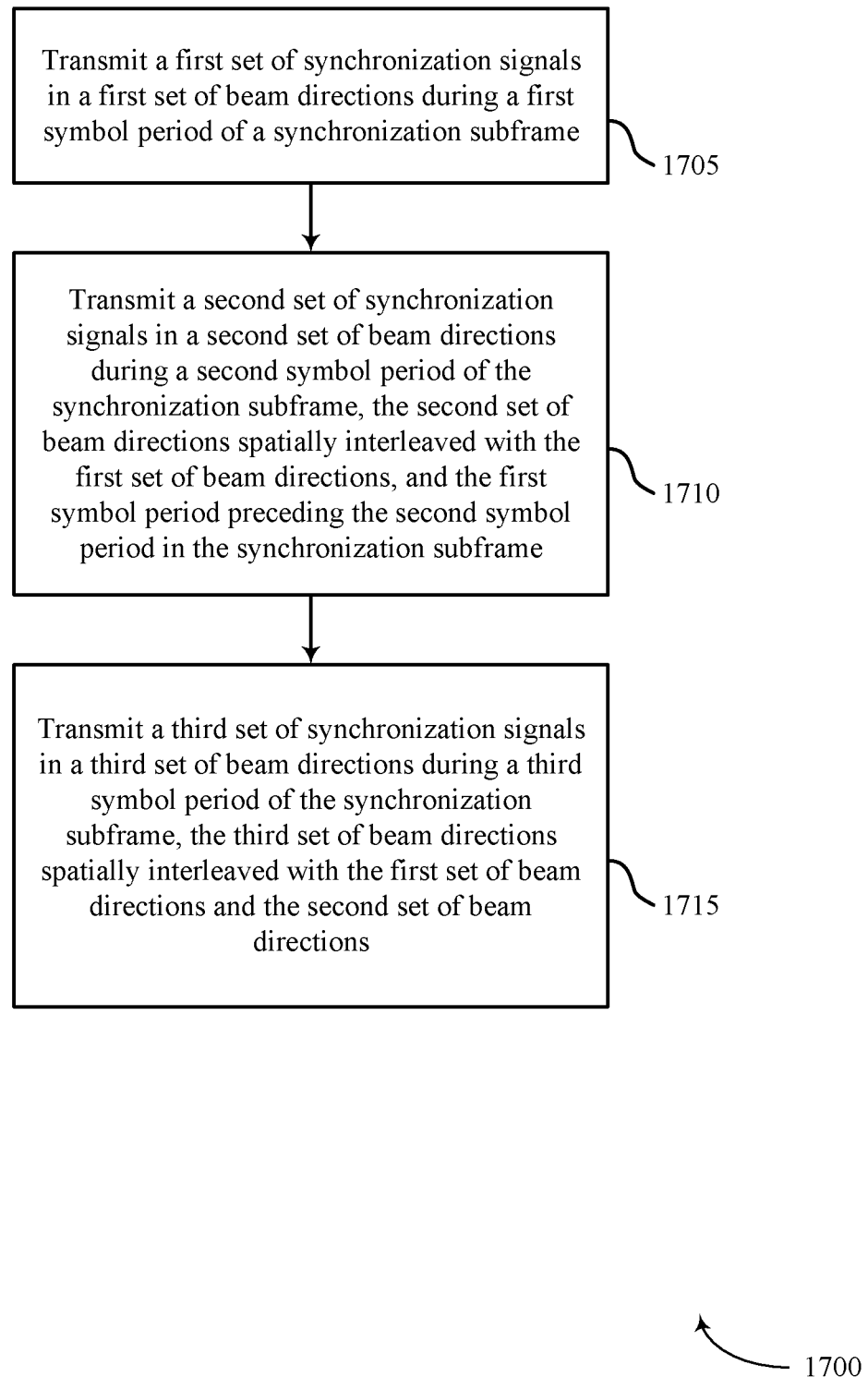

FIG. 17 shows a flowchart illustrating a method 1700 for interleaved beam sweeping for synchronization and random access procedures in accordance with various aspects of the present disclosure. The operations of method 1700 may be implemented by a device such as a base station 105 or its components as described with reference to FIGS. 1 through 5. For example, the operations of method 1700 may be performed by the base station beam direction manager as described herein. In some examples, the base station 105 may execute a set of codes to control the functional elements of the device to perform the functions described below.

Additionally or alternatively, the base station 105 may perform aspects the functions described below using special-purpose hardware.

At block 1705, the base station 105 may transmit a first set of synchronization signals in a first set of beam directions during a first symbol period of a synchronization subframe as described above with reference to FIGS. 2 through 5. In certain examples, the operations of block 1705 may be performed by the first synchronization signal component as described with reference to FIGS. 7 and 8.

At block 1710, the base station 105 may transmit a second set of synchronization signals in a second set of beam directions during a second symbol period of the synchronization subframe, the second set of beam directions spatially interleaved with the first set of beam directions, and the first symbol period preceding the second symbol period in the synchronization subframe, as described above with reference to FIGS. 2 through 5. In certain examples, the operations of block 1710 may be performed by the second synchronization signal component as described with reference to FIGS. 7 and 8.

At block 1715, the base station 105 may transmit a third set of synchronization signals in a third set of beam directions during a third symbol period of the synchronization subframe, the third set of beam directions spatially interleaved with the first set of beam directions and the second set of beam directions as described above with reference to FIGS. 2 through 5. In certain examples, the operations of block 1715 may be performed by the third synchronization signal component as described with reference to FIGS. 7 and 8.

Figure 18:
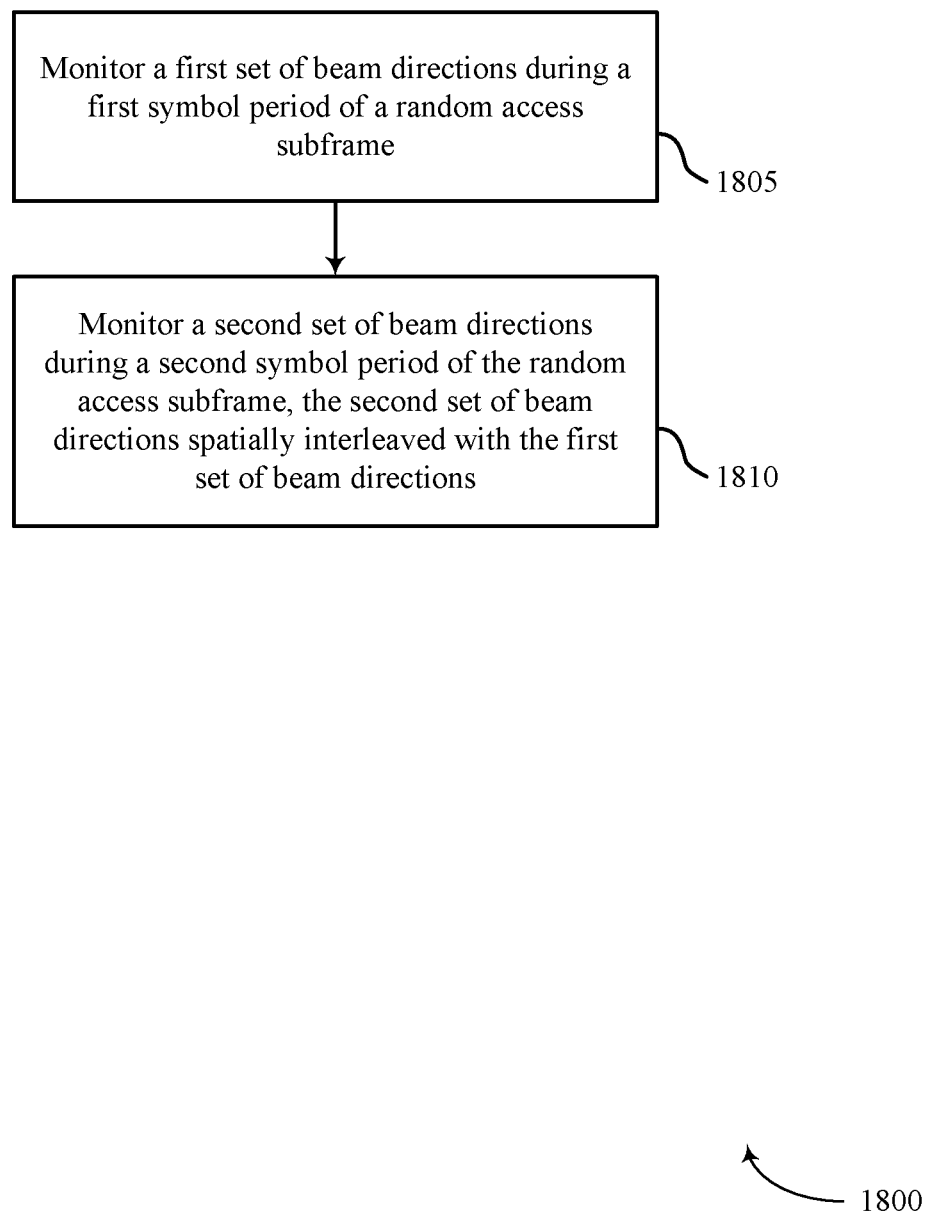

FIG. 18 shows a flowchart illustrating a method 1800 for interleaved beam sweeping for synchronization and random access procedures in accordance with various aspects of the present disclosure. The operations of method 1800 may be implemented by a device such as a base station 105 or its components as described with reference to FIGS. 1 through 5. For example, the operations of method 1800 may be performed by the base station beam direction manager as described herein. In some examples, the base station 105 may execute a set of codes to control the functional elements of the device to perform the functions described below. Additionally or alternatively, the base station 105 may perform aspects the functions described below using special-purpose hardware.

At block 1805, the base station 105 may monitor a first set of beam directions during a first symbol period of a random access subframe as described above with reference to FIGS. 2 through 5. In certain examples, the operations of block 1805 may be performed by the beam direction monitoring component as described with reference to FIGS. 7 and 8.

At block 1810, the base station 105 may monitor a second set of beam directions during a second symbol period of the random access subframe, the second set of beam directions spatially interleaved with the first set of beam directions as described above with reference to FIGS. 2 through 5. In certain examples, the operations of block 1810 may be performed by the beam direction monitoring component as described with reference to FIGS. 7 and 8.

Figure 19:
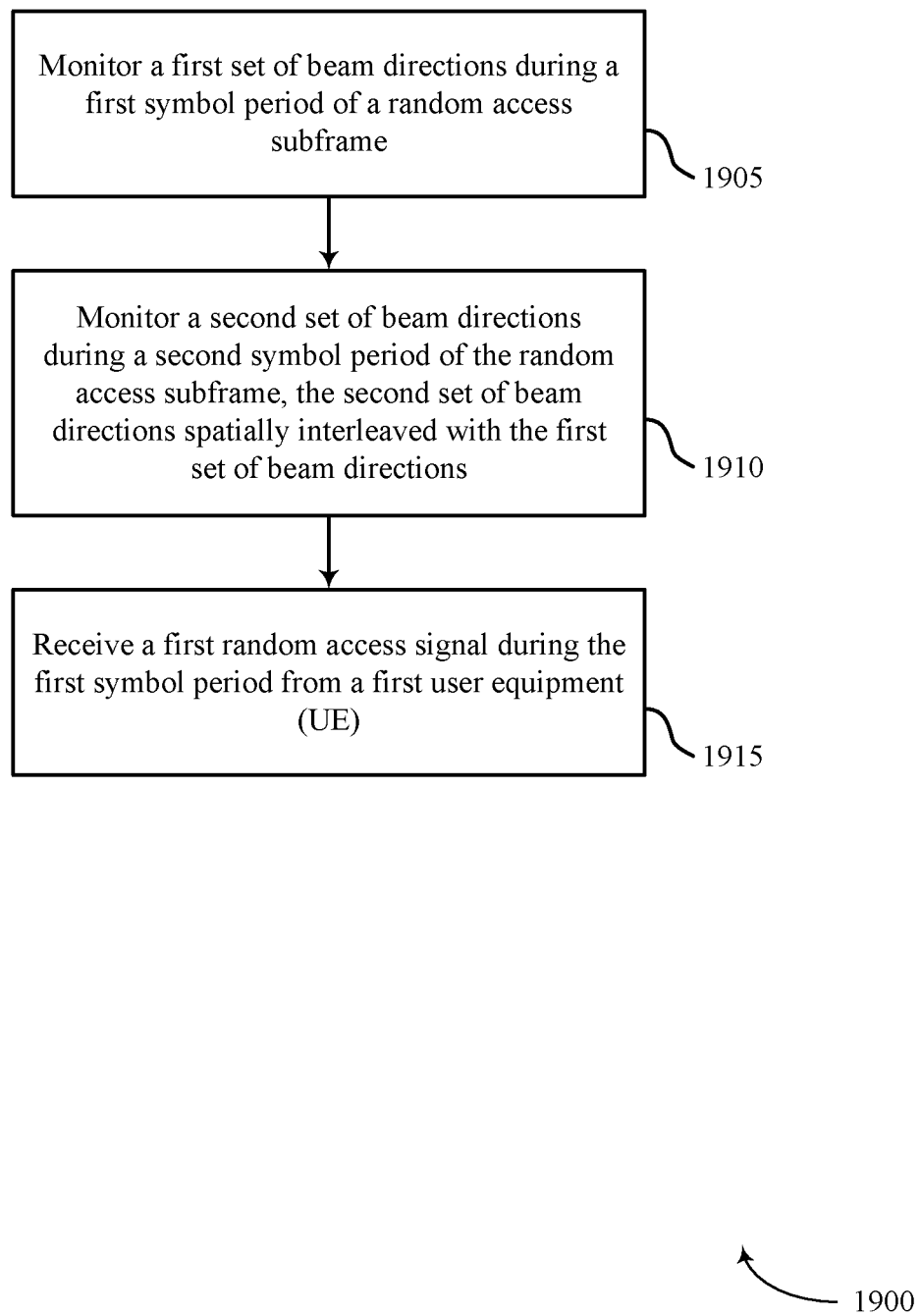

FIG. 19 shows a flowchart illustrating a method 1900 for interleaved beam sweeping for synchronization and random access procedures in accordance with various aspects of the present disclosure. The operations of method 1900 may be implemented by a device such as a base station 105 or its components as described with reference to FIGS. 1 through 5. For example, the operations of method 1900 may be performed by the base station beam direction manager as described herein. In some examples, the base station 105 may execute a set of codes to control the functional elements of the device to perform the functions described below. Additionally or alternatively, the base station 105 may perform aspects the functions described below using special-purpose hardware.

At block 1905, the base station 105 may monitor a first set of beam directions during a first symbol period of a random access subframe as described above with reference to FIGS. 2 through 5. In certain examples, the operations of block 1905 may be performed by the beam direction monitoring component as described with reference to FIGS. 7 and 8.

At block 1910, the base station 105 may monitor a second set of beam directions during a second symbol period of the random access subframe, the second set of beam directions spatially interleaved with the first set of beam directions as described above with reference to FIGS. 2 through 5. In certain examples, the operations of block 1910 may be performed by the beam direction monitoring component as described with reference to FIGS. 7 and 8.

At block 1915, the base station 105 may receive a first random access signal during the first symbol period from a first UE as described above with reference to FIGS. 2 through 5. In certain examples, the operations of block 1915 may be performed by the RACH component as described with reference to FIGS. 7 and 8.

Figure 20:
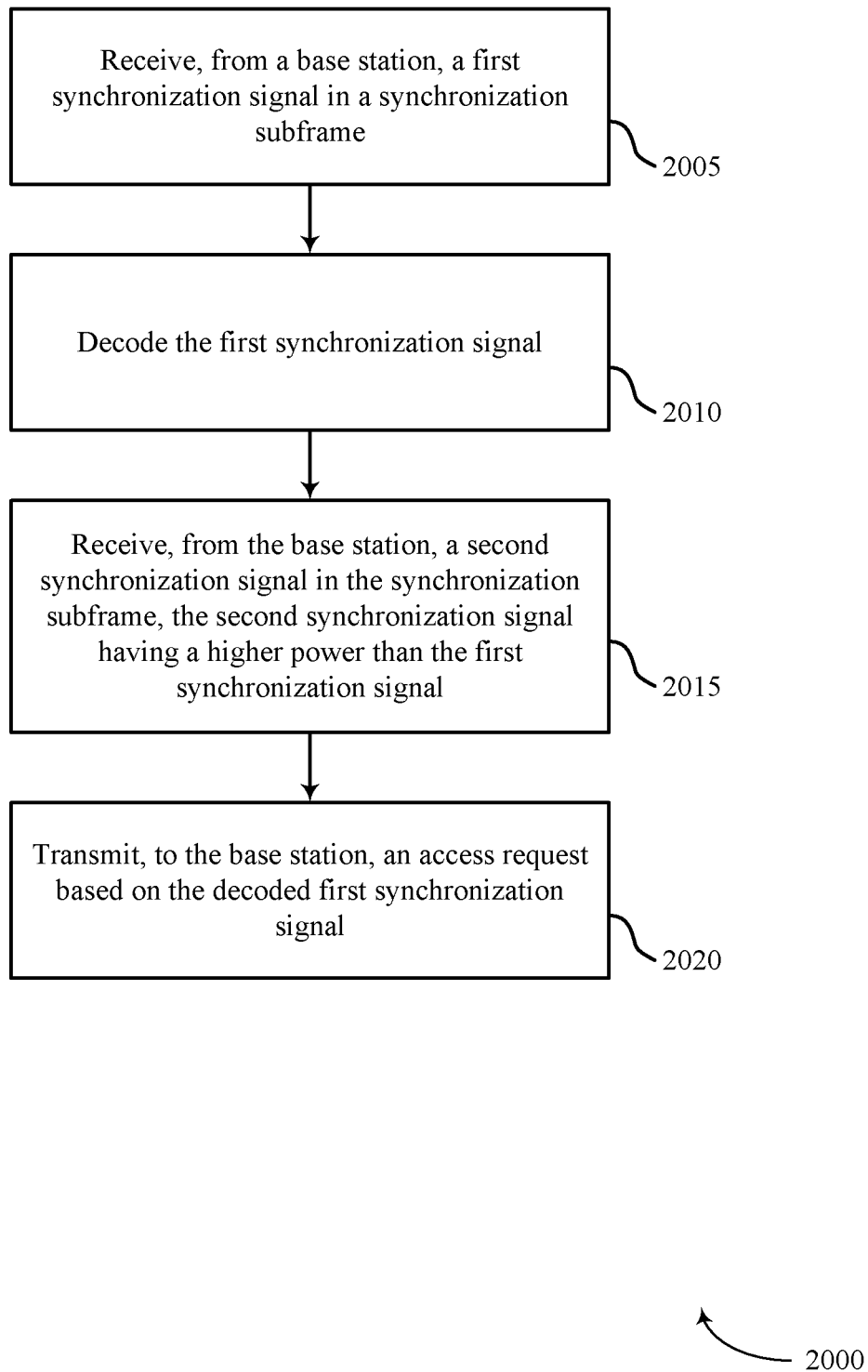

FIG. 20 shows a flowchart illustrating a method 2000 for interleaved beam sweeping for synchronization and random access procedures in accordance with various aspects of the present disclosure. The operations of method 2000 may be implemented by a device such as a UE 115 or its components as described with reference to FIGS. 1 through 5. For example, the operations of method 2000 may be performed by the UE beam direction manager as described herein. In some examples, the UE 115 may execute a set of codes to control the functional elements of the device to perform the functions described below. Additionally or alternatively, the UE 115 may perform aspects the functions described below using special-purpose hardware.

At block 2005, the UE 115 may receive, from a base station, a first synchronization signal in a synchronization subframe as described above with reference to FIGS. 2 through 5. In certain examples, the operations of block 2005 may be performed by the synchronization signal component as described with reference to FIGS. 11 and 12.

At block 2010, the UE 115 may decode the first synchronization signal as described above with reference to FIGS. 2 through 5. In certain examples, the operations of block 2010 may be performed by the decoder as described with reference to FIGS. 11 and 12.

At block 2015, the UE 115 may receive, from the base station, a second synchronization signal in the synchronization subframe, the second synchronization signal having a higher power than the first synchronization signal as described above with reference to FIGS. 2 through 5. In certain examples, the operations of block 2015 may be performed by the synchronization signal component as described with reference to FIGS. 11 and 12.

At block 2020, the UE 115 may transmit, to the base station, an access request based on the decoded first synchronization signal as described above with reference to FIGS. 2 through 5. In certain examples, the operations of block 2020 may be performed by the access request component as described with reference to FIGS. 11 and 12.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for interleaved beam sweeping for synchronization and random access.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for interleaved beam sweeping for synchronization and random access. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a base station, comprising:
   transmitting a first plurality of synchronization signals in a first set of beam directions during a first symbol period of a synchronization subframe;
   transmitting a second plurality of synchronization signals in a second set of beam directions during a second symbol period of the synchronization subframe, the second set of beam directions spatially interleaved with the first set of beam directions, and the first symbol period preceding the second symbol period in the synchronization subframe;
   monitoring the second set of beam directions of a random access subframe; and
   receiving, from a user equipment (UE) in a beam direction of the second set of beam directions, a random access signal based at least in part on a synchronization signal of the first plurality of synchronization signals transmitted by the base station in the first set of beam directions.

2. The method of claim 1, further comprising:
   monitoring the first set of beam directions during a first symbol period of a random access subframe; and
   monitoring the second set of beam directions during a second symbol period of the random access subframe.

3. The method of claim 1, wherein the second set of beam directions alternate radially with the first set of beam directions.

4. The method of claim 1, wherein each beam direction of the first set of beam directions are non-contiguous with each other beam direction of the first set of beam directions.

5. The method of claim 1, further comprising:
   transmitting, during a third symbol period of the synchronization subframe, the first plurality of synchronization signals in the first set of beam directions.

6. The method of claim 5, wherein the third symbol period is contiguous with the first symbol period.

7. The method of claim 1, further comprising:
   transmitting a third plurality of synchronization signals in a third set of beam directions during a third symbol period of the synchronization subframe, the third set of beam directions spatially interleaved with the first set of beam directions and the second set of beam directions.

8. The method of claim 1, wherein:
transmitting the first plurality of synchronization signals comprises transmitting the first plurality of synchronization signals using a plurality of ports of an antenna array of the base station; and
transmitting the second plurality of synchronization signals comprises transmitting the second plurality of synchronization signals using the plurality of ports of the antenna array.

9. The method of claim 1, wherein the random access signal is further based at least in part on a synchronization signal of the second plurality of synchronization signals transmitted by the base station in the second set of beam directions.

10. A method of wireless communication at a base station, comprising:
transmitting a first plurality of synchronization signals in a first set of beam directions;
monitoring the first set of beam directions during a first symbol period of a random access subframe;
monitoring a second set of beam directions during a second symbol period of the random access subframe, the second set of beam directions spatially interleaved with the first set of beam directions; and
receiving, from a user equipment (UE) in a beam direction of the second set of beam directions, a random access signal based at least in part on a synchronization signal of the first plurality of synchronization signals transmitted by the base station in the first set of beam directions.

11. The method of claim 10, wherein the second set of beam directions alternate radially with the first set of beam directions.

12. The method of claim 10, wherein each beam direction of the first set of beam directions are non-contiguous with each other beam direction of the first set of beam directions.

13. The method of claim 10, further comprising:
monitoring a third set of beam directions during a third symbol period of the random access subframe, the third set of beam directions spatially interleaved with the first set of beam directions and the second set of beam directions.

14. The method of claim 10, wherein:
monitoring the first set of beam directions comprises monitoring the first set of beam directions using a plurality of ports of an antenna array of the base station during the first symbol period; and
monitoring the second set of beam directions comprises monitoring the second set of beam directions using the plurality of ports during the second symbol period.

15. The method of claim 10, wherein the random access signal is further based at least in part on a second synchronization signal transmitted by the base station in the second set of beam directions.

16. An apparatus for wireless communication, comprising:
a processor;
memory in electronic communication with the processor; and
instructions stored in the memory and operable, when executed by the processor, to cause the apparatus to:
transmit a first plurality of synchronization signals in a first set of beam directions during a first symbol period of a synchronization subframe;
transmit a second plurality of synchronization signals in a second set of beam directions during a second symbol period of the synchronization subframe, the second set of beam directions spatially interleaved with the first set of beam directions, and the first symbol period preceding the second symbol period in the synchronization subframe;
monitor the second set of beam directions of a random access subframe; and
receive, from a user equipment (UE) in a beam direction of the second set of beam directions, a random access signal based at least in part on a synchronization signal of the first plurality of synchronization signals transmitted by the base station in the first set of beam directions.

17. The apparatus of claim 16, wherein the instructions are operable to cause the processor to:
monitor the first set of beam directions during a first symbol period of a random access subframe; and
monitor the second set of beam directions during a second symbol period of the random access subframe.

18. The apparatus of claim 16, wherein the second set of beam directions alternate radially with the first set of beam directions.

19. The apparatus of claim 16, wherein each beam direction of the first set of beam directions are non-contiguous with each other beam direction of the first set of beam directions.

20. The apparatus of claim 16, wherein the instructions are operable to cause the processor to:
transmit, during a third symbol period of the synchronization subframe, the first plurality of synchronization signals in the first set of beam directions.

21. The apparatus of claim 20, wherein the third symbol period is contiguous with the first symbol period.

22. The apparatus of claim 16, wherein the instructions are operable to cause the processor to:
transmit a third plurality of synchronization signals in a third set of beam directions during a third symbol period of the synchronization subframe, the third set of beam directions spatially interleaved with the first set of beam directions and the second set of beam directions.

23. The apparatus of claim 16, wherein:
the instructions operable to cause the processor to transmit the first plurality of synchronization signals comprise instructions operable to cause the processor to transmit the first plurality of synchronization signals using a plurality of ports of an antenna array of the base station; and
the instructions operable to cause the processor to transmit the second plurality of synchronization signals comprise instructions operable to cause the processor to transmit the second plurality of synchronization signals using the plurality of ports of the antenna array.

24. The apparatus of claim 16, wherein the random access signal is further based at least in part on a synchronization signal of the second plurality of synchronization signals transmitted by the apparatus in the second set of beam directions.

25. An apparatus for wireless communication, comprising:
a processor;
memory in electronic communication with the processor; and
instructions stored in the memory and operable, when executed by the processor, to cause the apparatus to:
transmit a first plurality of synchronization signals in a first set of beam directions;

monitor a first set of beam directions during a first symbol period of a random access subframe;

monitor a second set of beam directions during a second symbol period of the random access subframe, the second set of beam directions spatially interleaved with the first set of beam directions; and receive, from a user equipment (UE) in a beam direction of the second set of beam directions, a random access signal based at least in part on a synchronization signal of the first plurality of synchronization signals transmitted by the apparatus in the first set of beam directions.

26. The apparatus of claim 25, wherein the second set of beam directions alternate radially with the first set of beam directions.

27. The apparatus of claim 25, wherein each beam direction of the first set of beam directions are non-contiguous with each other beam direction of the first set of beam directions.

28. The apparatus of claim 25, wherein the instructions are operable to cause the processor to:

monitor a third set of beam directions during a third symbol period of the random access subframe, the third set of beam directions spatially interleaved with the first set of beam directions and the second set of beam directions.

29. The apparatus of claim 25, wherein:

the instructions operable to cause the processor to monitor the first set of beam directions comprise instructions operable to cause the processor to monitor the first set of beam directions using a plurality of ports of an antenna array of the base station during the first symbol period; and the instructions operable to cause the processor to monitor the second set of beam directions comprise instructions operable to cause the processor to monitor the second set of beam directions using the plurality of ports during the second symbol period.

30. The apparatus of claim 25, wherein the random access signal is further based at least in part on a second synchronization signal transmitted by the base station in the second set of beam directions.

* * * * *